US012639354B2

(12) United States Patent
Somasundaram et al.

(10) Patent No.: US 12,639,354 B2
(45) Date of Patent: May 26, 2026

(54) GENERATING DRAFT SEQUENCE RANKINGS FOR SPECULATIVE DECODING USING LARGE LANGUAGE MODEL HIDDEN STATES

(71) Applicant: Adobe Inc., San Jose, CA (US)

(72) Inventors: Shwetha Somasundaram, Chennai (IN); Apoorv Umang Saxena, Bengaluru (IN); Anirudh Phukan, Bengaluru (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/924,398

(22) Filed: Oct. 23, 2024

(65) Prior Publication Data

US 2026/0111474 A1 Apr. 23, 2026

(51) Int. Cl.
*G06F 16/338* (2019.01)
*G06F 16/334* (2025.01)

(52) U.S. Cl.
CPC ........ *G06F 16/338* (2019.01); *G06F 16/3344* (2019.01)

(58) Field of Classification Search
CPC ..................................................... G06F 16/338
See application file for complete search history.

(56) References Cited

U.S. PATENT DOCUMENTS

2024/0362419 A1* 10/2024 Kumar .................... G06F 40/40
2024/0412720 A1* 12/2024 Vasylyev .......... G06F 16/90332
2025/0245432 A1* 7/2025 Pan ........................ G06N 3/047
2025/0322154 A1* 10/2025 Malviya ................ G06F 40/216

OTHER PUBLICATIONS

Andrea Santilli, Silvio Severino, Emilian Postolache, Valentino Maiorca, Michele Mancusi, Riccardo Marin, and Emanuele Rodolà, "Accelerating Transformer Inference for Translation via Parallel Decoding", 18 pages, arXiv preprint arXiv:2305.10427v1, May 17, 2023.

Apoorv Saxena. "Prompt Lookup Decoding", Webpage <https://github.com/apoorvumang/prompt-lookup-decoding>, pp. 1-3, 2023, Accessed Nov. 18, 2024.

(Continued)

*Primary Examiner* — Van H Oberly
(74) *Attorney, Agent, or Firm* — Keller Preece PLLC

(57) ABSTRACT

The present disclosure relates to systems, non-transitory computer-readable media, and methods for using hidden states of a large language model to generate responses to queries via speculative decoding. In particular, the disclosed systems determine, for a large language model ("LLM"), a prompt comprising a query and an input guide text related to the query. The disclosed systems determine, at a time step of the LLM, candidate draft predictions from token sequences in the input guide text that correspond to a most recent token generated by the LLM. The disclosed systems generate, at the time step of the LLM, a draft prediction by comparing tokens associated with the candidate draft predictions to a hidden state of a previous token prior to the most recent token. Furthermore, the disclosed systems generate, for display via a client device, a response comprising the draft prediction for the prompt to the LLM.

20 Claims, 8 Drawing Sheets

(56) References Cited

OTHER PUBLICATIONS

Charlie Chen, Sebastian Borgeaud, Geoffrey Irving, Jean-Baptiste Lespiau, Laurent Sifre, and John Jumper, "Accelerating Large Language Model Decoding with Speculative Sampling", 11 pages, arXiv preprint arXiv:2302.01318v1, Feb. 2, 2023.
Giovanni Monea, Armand Joulin, and Edouard Grave, "Pass: Parallel Speculative Sampling", 6 pages, arXiv preprint arXiv:2311.13581v1, Nov. 22, 2023.
Haopeng Zhang, Hayate Iso, Sairam Gurajada, and Nikita Bhutani, "Xatu: A Fine-grained Instruction-based Benchmark for Explainable Text Updates", 14 pages, arXiv preprint arXiv:2309.11063v1, Sep. 20, 2023.
Heming Xia, Tao Ge, Furu Wei, and Zhifang Sui, "Lossless Speedup of Autoregressive Translation with Generalized Aggressive Decoding", 14 pages, arXiv preprint arXiv:2203.16487v1, Mar. 30, 2022.
Heming Xia, Zhe Yang, Qingxiu Dong, Peiyi Wang, Yongqi Li, Tao Ge, Tianyu Liu, Wenjie Li, and Zhifang Sui, "Unlocking Efficiency in Large Language Model Inference: A Comprehensive Survey of Speculative Decoding", 17 pages, arXiv preprint arXiv:2401.07851V3, Jun. 4, 2024.
Jiawei Guo, Ziming Li, Xueling Liu, Kaijing Ma, Tianyu Zheng, Zhouliang Yu, Ding Pan, Yizhi Li, Ruibo Liu, Yue Wang, Shuyue Guo, Xingwei Qu, Xiang Yue, Ge Zhang, Wenhu Chen, and Jie Fu, "CodeEditorBench: Evaluating Code Editing Capability of Large Language Models", 29, pages, arXiv preprint arXiv:2404.03543v2, Apr. 6, 2024.
Jun Zhang, Jue Wang, Huan Li, Lidan Shou, Ke Chen, Gang Chen, and Sharad Mehrotra, "Draft & Verify: Lossless Large Language Model Acceleration via Self-Speculative Decoding", 12 pages, arXiv preprint arXiv:2309.08168v1, Sep. 15, 2023.
Lianmin Zheng, Wei-Lin Chiang, Ying Sheng, Siyuan Zhuang, Zhanghao Wu, Yonghao Zhuang, Zi Lin, Zhuohan Li, Dacheng Li, Eric Xing, et al., "Judging LLM-as-a-Judge with MT-Bench and Chatbot Arena", Advances in Neural Information Processing Systems (NeurIPS 2023), 29 pages, arXiv preprint arXiv:2306.05685v4, Dec. 24, 2023.
Mitchell Stern, Noam Shazeer, and Jakob Uszkoreit, "Blockwise Parallel Decoding for Deep Autoregressive Models", 10 pages, Advances in Neural Information Processing Systems (NIPS 2018), arXiv preprint arXiv:1811.03115v1, Nov. 7, 2018.
Nan Yang, Tao Ge, Liang Wang, Binxing Jiao, Daxin Jiang, Linjun Yang, Rangan Majumder, and Furu Wei, "Inference with Reference: Lossless Acceleration of Large Language Models", 9 pages, arXiv preprint arXiv:2304.04487v1, Apr. 10, 2023.
Omid Kashefi, Tazin Afrin, Meghan Dale, Christopher Olshefski, Amanda Godley, Diane Litman, and Rebecca Hwa, "ArgRewrite V.2: an Annotated Argumentative Revisions Corpus", Language Resources and Evaluation, 33pages, arXiv preprint arXiv:2206.01677v1, Jun. 3, 2022.
Ramesh Nallapati, Bowen Zhou, Cicero dos Santos, Çaglar Gulçehre, and Bing Xiang, "Abstractive Text Summarization using Sequence-to-sequence RNNs and Beyond", In Proceedings of the 20th SIGNLL Conference on Computational Natural Language Learning (CONLL), pp. 280-290, Berlin, Germany. Association for Computational Linguistics, Aug. 2016.
Seongjun Yang, Gibbeum Lee, Jaewoong Cho, Dimitris Papailiopoulos, and Kangwook Lee, "Predictive Pipelined Decoding: A Compute-Latency Trade-off for Exact LLM Decoding", Transactions on Machine Learning Research, 13 pages, arXiv preprint arXiv:2307.05908v1, Jul. 12, 2023.
Tianle Cai, Yuhong Li, Zhengyang Geng, Hongwu Peng, Jason D Lee, Deming Chen, and Tri Dao, "MEDUSA: Simple LLM Inference Acceleration Framework with Multiple Decoding Heads", 27 pages, arXiv preprint arXiv:2401.10774v3, Jun. 14, 2024.
Xiaoxuan Liu, Lanxiang Hu, Peter Bailis, Ion Stoica, Zhijie Deng, Alvin Cheung, and Hao Zhang, "Online speculative Decoding", 16 pages, arXiv preprint arXiv:2310.07177v2, Oct. 17, 2023.
Xupeng Miao, Gabriele Oliaro, Zhihao Zhang, Xinhao Cheng, Zeyu Wang, Rae Ying Yee Wong, Zhuoming Chen, Daiyaan Arfeen, Reyna Abhyankar, and Zhihao Jia, "SpecInfer: Accelerating Generative LLM Serving with Speculative Inference and Token Tree Verification", 15 pages, arXiv preprint arXiv:2305.09781v2, Aug. 16, 2023.
Yaniv Leviathan, Matan Kalman, and Yossi Matias, "Fast Inference from Transformers via Speculative Decoding", In International Conference on Machine Learning, pp. 19274-19286. PMLR. 2023.
Yichao Fu, Peter Bailis, Ion Stoica, and Hao Zhang, Break the Sequential Dependency of LLM Inference Using Lookahead Decoding. 16 pages, arXiv preprint arXiv:2402.02057v1, Feb. 3, 2024.
Yuhui Li, Fangyun Wei, Chao Zhang, and Hongyang Zhang, "EAGLE: Speculative Sampling Requires Rethinking Feature Uncertainty", 13 pages, arXiv preprint arXiv:2401.15077, Feb. 4, 2024.
Zachary Ankner, Rishab Parthasarathy, Aniruddha Nrusimha, Christopher Rinard, Jonathan Ragan-Kelley, and William Brandon, "Hydra: Sequentially-Dependent Draft Heads for Medusa De-coding", 17 pages, arXiv preprint arXiv:2402.05109v2, Oct. 7, 2024.
Zhenyu He, Zexuan Zhong, Tianle Cai, Jason D Lee, and Di He, "REST: Retrieval-Based Speculative Decoding", 11 pages, arXiv preprint arXiv:2311.08252v1, Nov. 14, 2023.

* cited by examiner

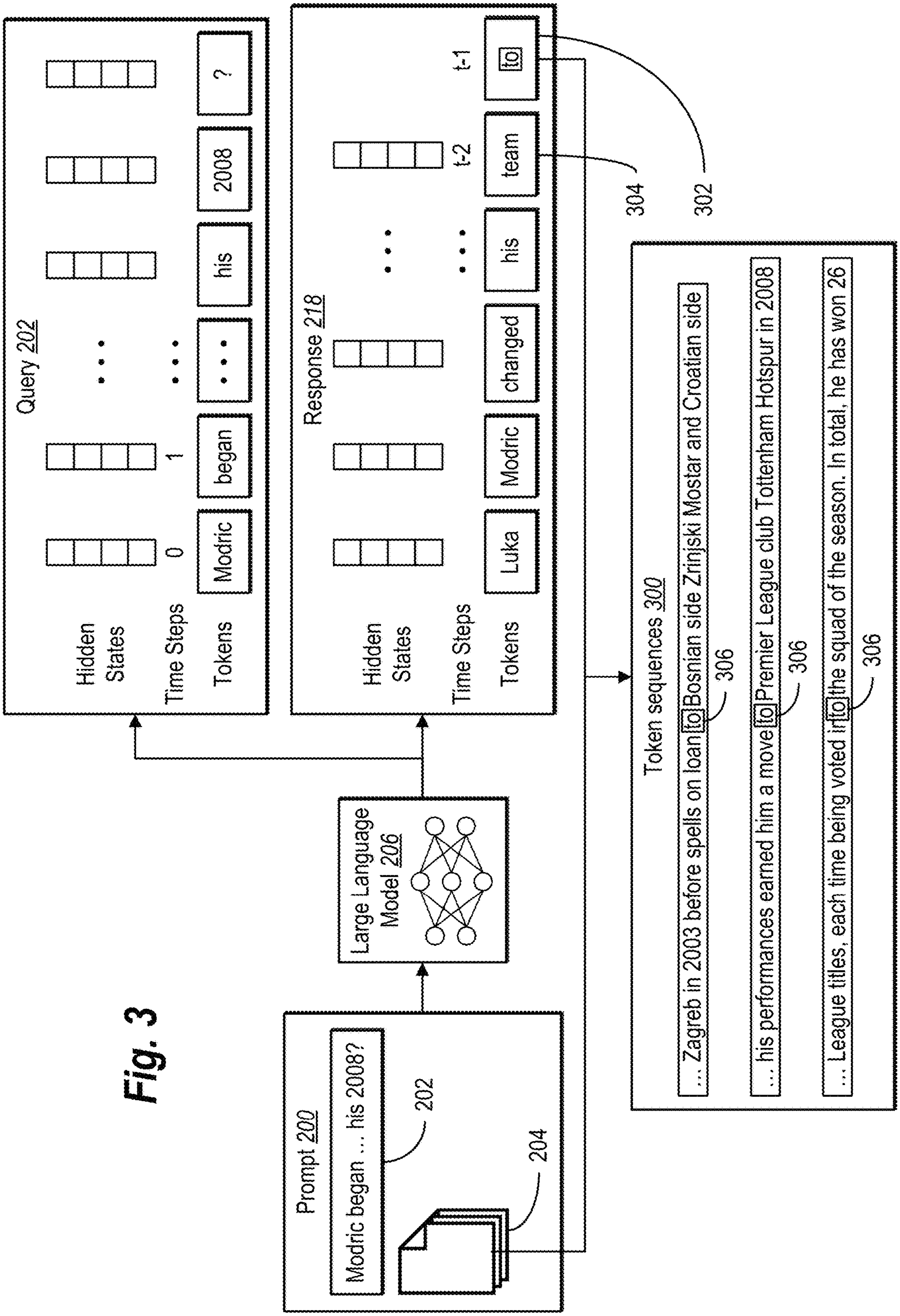
Fig. 3
Prompt 200
Modric began ... his 2008?
202
204
Large Language Model 206
Query 202
Hidden States
Time Steps
Tokens
0
1
Modric
began
his
2008
?
Response 218
Luka
Modric
changed
his
team
to
t-2
t-1
304
302
Token sequences 300
... Zagreb in 2003 before spells on loan to Bosnian side Zrinjski Mostar and Croatian side
... his performances earned him a move to Premier League club Tottenham Hotspur in 2008
... League titles, each time being voted in to the squad of the season. In total, he has won 26
306
306
306

700

Determining, For A Large Language Model, A Prompt Comprising A Query And An Input Guide Text Related To The Query 702

Determining One Or More Candidate Draft Predictions From The Input Guide Text 704

Determining One Or More Token Sequences In The Input Guide Text That Comprise A Most Recent Token Generated By The Large Language Model 706

Generating, At A Time Step Of The Large Language Model, A Draft Prediction From The One Or More Candidate Draft Predictions 708

Comparing Tokens Associated With The One Or More Candidate Draft Predictions To A Most Recent Hidden State Generated By The Large Language Model 710

Selecting A Candidate Draft Prediction With A Highest Similarity To The Most Recent Hidden State 712

Generating, For The Prompt, A Response Comprising The Draft Prediction For Display Via A Client Device 714

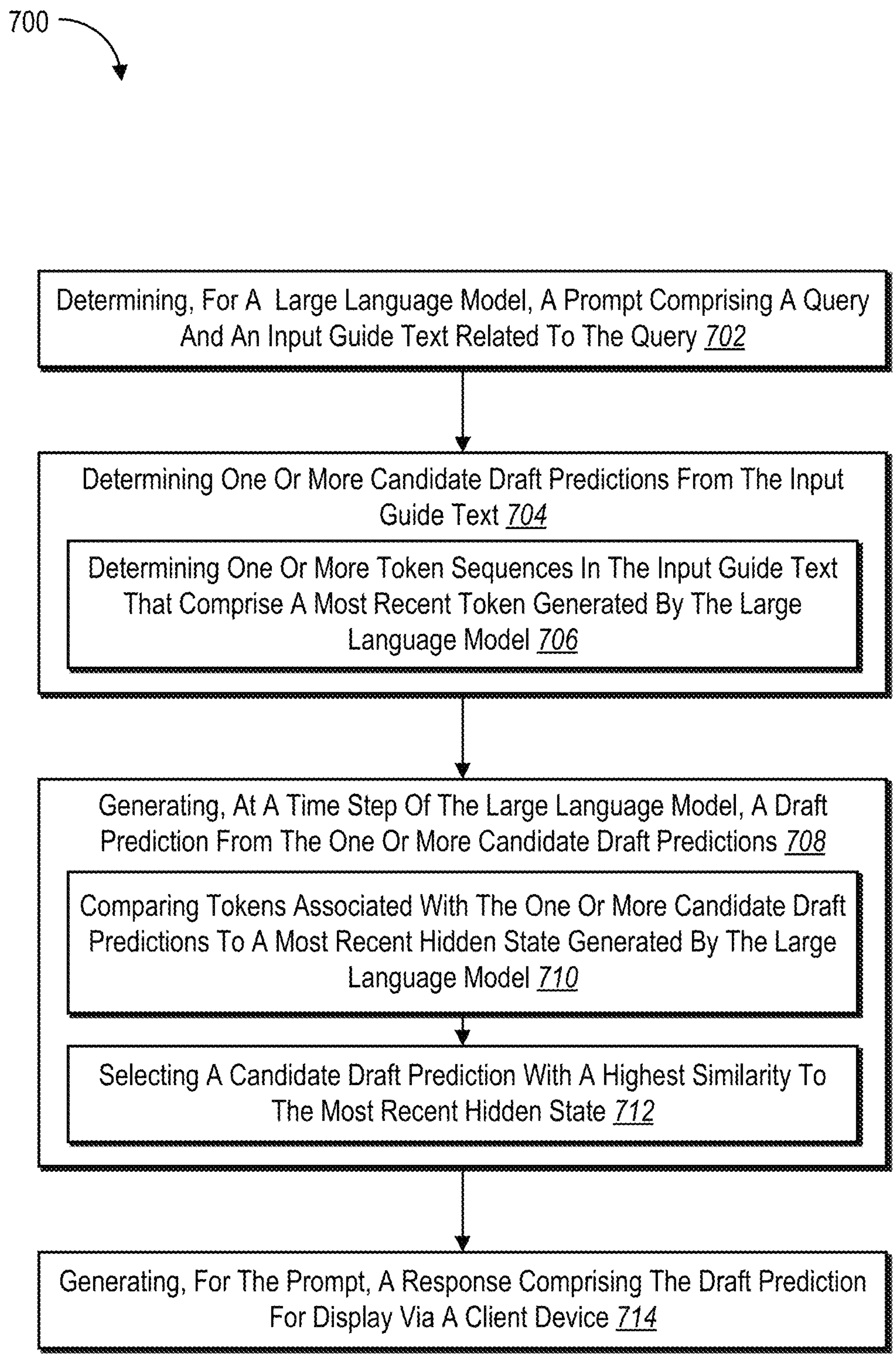

*Fig. 7*

GENERATING DRAFT SEQUENCE RANKINGS FOR SPECULATIVE DECODING USING LARGE LANGUAGE MODEL HIDDEN STATES

BACKGROUND

Recent years have seen significant improvements in generative AI technology such as generative large language models (LLMs). For example, large language models are increasingly used in many different use cases to generate or edit text or code and/or in combination with other models to generate or edit other types of digital media (e.g., for digital image, audio, or video generation/editing). Although large language models are proving useful in many different fields of technology, many large language models are limited to certain technological environments due to their architecture. Specifically, many large language models have many parameters and require a significant amount of time and computing resources to generate digital content, thus limiting their implementation to certain types of devices while preventing their use in other devices (e.g., certain mobile devices). Conventional systems have a number of drawbacks that negatively impact the efficiency and flexibility of large language models for application across different use cases.

SUMMARY

Embodiments of the present disclosure provide benefits and/or solve one or more of the foregoing or other problems in the art with systems, non-transitory computer-readable media, and methods for using speculative decoding in an LLM to efficiently generate responses based on input guides by leveraging internal hidden states generated by the LLM. In particular, in one or more embodiments, in response to a prompt to the LLM including a query and an input guide text, the disclosed systems determine candidate draft predictions for generating a response to the query based on the input guide text. For example, the disclosed systems determine candidate draft predictions by identifying token sequences in the input guide text that correspond to a most recent token generated by the LLM. Further, in one or more implementations, the disclosed systems select one of the candidate draft predictions to generate the draft prediction for draft prediction verification using hidden states generated by the LLM. Moreover, in one or more embodiments, the disclosed systems perform draft prediction verification on the draft prediction to generate a plurality of tokens for a response to the query at a single time step of the LLM.

Additional features and advantages of one or more embodiments of the present disclosure are outlined in the description which follows, and in part are determined from the description, or are learned by the practice of such example embodiments.

BRIEF DESCRIPTION OF THE DRAWINGS

The detailed description provides one or more embodiments with additional specificity and detail through the use of the accompanying drawings, as briefly described below.

FIG. 3 illustrates a diagram of the draft prediction generation system using hidden states generated by a large language model to determine candidate draft predictions in accordance with one or more embodiments.

FIG. 7 illustrates a flowchart of an example series of acts for generating a sequence of tokens for a response to a large language model query at a single time step of the large language model using a draft prediction selected via hidden states generated by the large language model in accordance with one or more embodiments.

DETAILED DESCRIPTION

Figure 1:
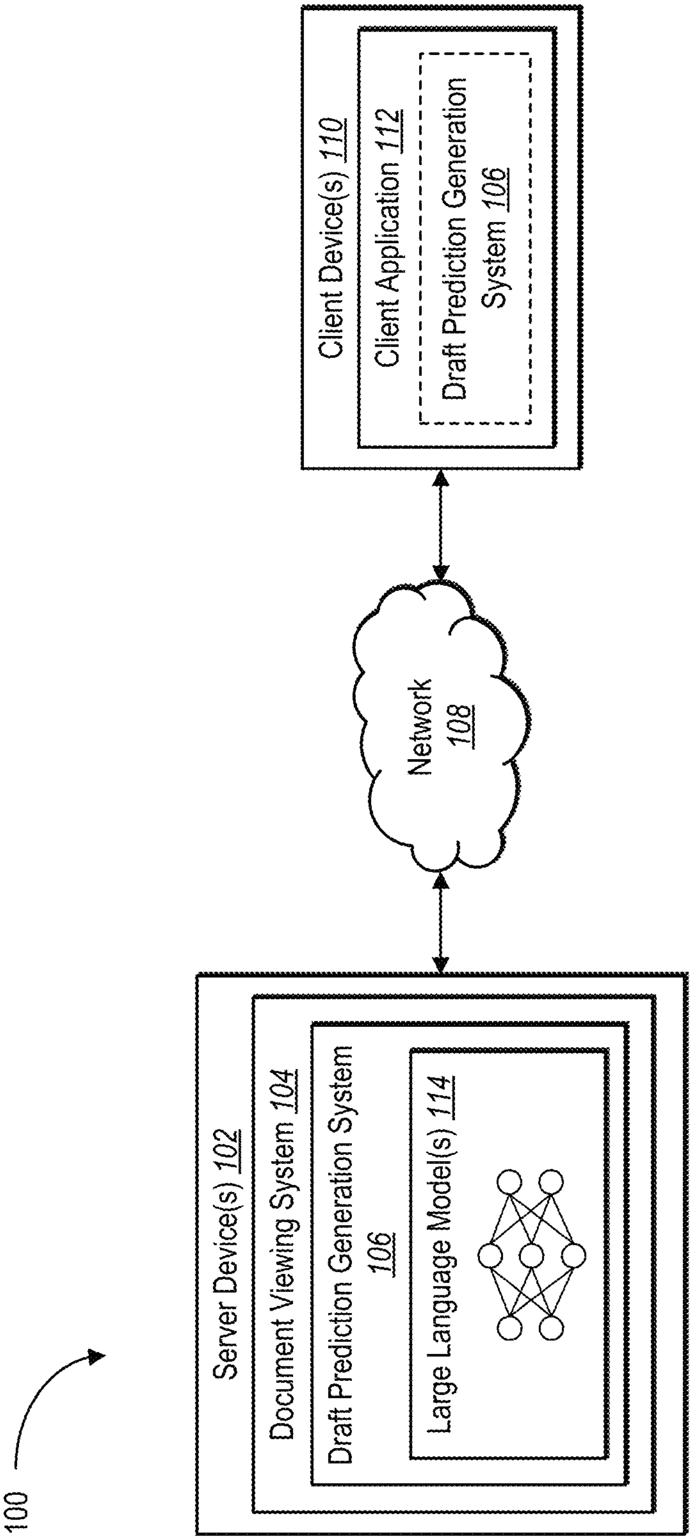
FIG. 1 illustrates an example system environment in which a draft prediction generation system operates in accordance with one or more embodiments.

This disclosure describes one or more embodiments of a draft prediction generation system that uses speculative decoding in an LLM to generate responses based on input guides by leveraging internal hidden states generated by the LLM. In particular, in one or more implementations, the draft prediction generation system uses hidden states of the LLM to generate draft predictions based on a prompt to the LLM including an input guide text. For example, in some embodiments, the draft prediction generation system selects candidate draft predictions identified in the input guide text for a particular token generated by the LLM at a time step based on a similarity to a recently generated hidden state. Furthermore, the draft prediction generation system uses the selected candidate draft prediction to generate and verify a draft prediction for generating a plurality of tokens in a response to the query at a single time step of the LLM.

As mentioned above, in one or more embodiments, the draft prediction generation system determines candidate draft predictions at a time step of an LLM based on a prompt to the LLM including an input guide text. Specifically, in one or more implementations, the prompt includes the input guide text such as used for input-guided tasks (e.g., text, digital documents containing text such as PDFs or source code files, etc.). Further, in some embodiments, the draft prediction generation system identifies token sequences in the input guide text to use as candidate draft predictions for a current time step of an LLM based on a recently generated token. For example, in some implementations, the draft prediction generation system determines the candidate draft predictions by identifying token sequences in the input guide text that match the most recent token generated by the LLM. Moreover, in one or more embodiments, the draft prediction generation system generates each candidate draft prediction based on a token that matches the most recent token generated by the LLM and one or more tokens preceding and following the matching tokens.

As noted above, in one or more embodiments, the draft prediction generation system selects one of the candidate draft predictions to generate the draft prediction for verification using hidden states generated by the LLM. In particular, in one or more implementations, the draft prediction generation system determines a most recent hidden state generated by the LLM in the response to the query. In addition, in some embodiments, the draft prediction generation system generates hidden states of tokens corresponding to the candidate draft predictions. The draft prediction generation system performs a similarity comparison (e.g., a cosine similarity comparison) between the most recent hidden state generated by the LLM in the response to the query and the hidden state(s) of one or more tokens corresponding to the candidate draft predictions. Based on the results of the similarity comparison, in one or more embodiments, the draft prediction generation system selects one of the candidate draft predictions (e.g., the candidate draft prediction with the highest cosine similarity score) to generate the draft prediction for draft prediction verification.

As mentioned previously, in one or more implementations, the draft prediction generation system performs draft prediction verification on the draft prediction to generate multiple tokens of the response to the query at the current time step of the LLM. Specifically, the draft prediction generation system verifies the tokens of the draft prediction against the actual LLM generation. For example, the draft prediction generation system utilizes a verification model to accept and/or reject individual tokens of the draft prediction. Indeed, based on the verification model, in some embodiments, the draft prediction generation system accepts one or more tokens of the draft prediction and/or rejects one or more of the tokens. Furthermore, in some implementations, the draft prediction generation system uses the accepted tokens at the current time step of the LLM to generate a response to the query.

Although conventional generative AI systems that use LLMs are able to produce responses to queries, such systems have a number of problems in relation to accuracy, efficiency, and flexibility of operation. For instance, some conventional systems inefficiently produce responses to queries by using an LLM to generate responses token by token. Specifically, conventional systems often produce responses token by token using an autoregressive decoding approach to generate a string of tokens across a plurality of time steps. These conventional systems thus generate only a single token at each separate time step of the LLM, which results in relatively high latency and requires significant computational resources.

Some conventional systems attempt to overcome these inefficiencies by utilizing a speculative decoding approach to generate multiple tokens are generated at once, thereby accelerating the inference process. Such systems, predict various possible strings of tokens as possible drafts at a single time step for inclusion in the response. These conventional systems, however, require an additional external LLM to generate possible draft predictions from which a primary LLM selects a draft to generate a response to a query. Because these conventional systems utilize a separate LLM to generate candidate draft predictions, the conventional systems require the use of additional computational resources to operate the separate LLMs. Some other conventional systems select drafts from an external datastore, which requires a large set of existing samples from which to choose, which are typically generated using LLMs, thus requiring significant resources to generate and store/transmit the samples.

Additionally, conventional systems that use conventional speculative decoding methods often inaccurately select a draft from a set of possible drafts. For instance, some conventional systems use text (or string) matching for selecting the draft from among a set of possible drafts (e.g., based on a longest matching prefix of a possible draft). By selecting based on longest matching prefix, however, these conventional systems often select a sub-optimal draft from among the possible drafts (e.g., without considering the specific content of the possible drafts). Selecting sub-optimal drafts also results in relatively few tokens being verified and included in the response at each time step, which results in additional inefficiencies in response generation.

As suggested by the foregoing, the draft prediction generation system provides a variety of improvements relative to conventional systems. For example, by generating candidate draft predictions and determining a draft prediction from among the candidates using hidden states generated by the LLM, the draft prediction generation system improves efficiency relative to conventional systems. Specifically, in contrast to conventional systems using autoregressive decoding with a single token generated at each time step, the draft prediction generation system significantly speeds up inference by predicting and verifying a plurality of tokens for a single time step of an LLM, which results in significant efficiency gains. For example, the draft prediction generation system determines several candidate draft predictions, each including multiple tokens at a single time step, selects a draft prediction from among the candidates via the LLM hidden states for the time step, and verifies the multiple tokens of the draft prediction for generating LLM responses. The draft prediction generation system thus provides improved speed over models using autoregressive decoding processes.

Further, relative to conventional systems that use speculative decoding, the draft prediction generation system improves efficiency by preserving computational resources and speeding up inference. For example, in contrast to conventional systems that use an external LLM to generate a set of candidate draft predictions at a time step of an LLM that generates a final draft prediction, the draft prediction generation system utilizes the internal hidden states of a single LLM to generate candidate draft predictions and a response to a query. Indeed, in one or more embodiments, the draft prediction generation system uses previously generated tokens and previously generated hidden states of the LLM to generate candidate draft predictions, select a candidate draft prediction for generating a draft prediction, and generating a response. By using the hidden states of previously generated tokens, the draft prediction generation system speeds up inference with a single LLM, resulting in improved efficiency relative to conventional systems. For example, in one or more implementations, the draft prediction generation system uses the hidden states of previously drafted tokens to find the most similar candidate draft predictions to generate final draft predictions, resulting in more accurate draft predictions. Additionally, by selecting candidate draft predictions based on their similarity to previously generated internal hidden states, the draft prediction generation system verifies a greater number of tokens in a generated draft prediction, which in turn results in faster inference over many time steps.

Moreover, in some embodiments, by using the hidden states generated by an LLM to determine a draft prediction for a query in input-guided scenarios, the draft prediction generation system improves flexibility over conventional systems. Specifically, because LLMs generate hidden states to generate tokens in responses to queries, the draft prediction generation system flexibly integrates with existing LLMs without modifications to the LLMs. Additionally, the draft prediction generation system also provides improved flexibility by leveraging historical draft prediction data to finetune hyperparameters of an LLM for intelligently selecting draft spans (e.g., lengths of draft predictions).

Furthermore, in one or more embodiments, the draft prediction generation system uses the hidden states of previously generated tokens to improve accuracy relative to conventional systems. Specifically, in one or more implementations, by determining a similarity of candidate draft predictions to recently generated hidden states, the draft prediction system provides more accurate draft predictions from an input guide text. In contrast to conventional systems that require finetuning of LLMs, the draft prediction system provides accurate response generation by generating draft predictions based on similarities to internal hidden states of the LLM. Thus, the draft prediction generation system determines accurate draft predictions at each time step without requiring finetuning of LLMs. Furthermore, the draft prediction generation system generates accurate responses with improved efficiency while ensuring that responses are consistent with input guide texts.

Additional detail regarding the draft prediction generation system will now be provided with reference to the figures. For example, FIG. 1 illustrates a schematic diagram of a system environment 100 in which a draft prediction generation system 106 operates. As illustrated in FIG. 1, the system environment 100 includes a server device(s) 102, a network 108, and a client device(s) 110. Although the system environment 100 of FIG. 1 is depicted as having a particular number of components, the system environment 100 is capable of having any number of additional or alternative components (e.g., any number of server devices, client devices, or other components in communication with the draft prediction generation system 106 via the network 108). Similarly, although FIG. 1 illustrates a particular arrangement of the server device(s) 102, the network 108, and the client device(s) 110, various additional arrangements are possible.

The server device(s) 102, the network 108, and the client device(s) 110 are communicatively coupled with each other either directly or indirectly (e.g., through the network 108 discussed in greater detail below in relation to FIG. 8). Moreover, the server device(s) 102 and the client device(s) 110 include one or more of a variety of computing devices (including one or more computing devices as discussed in greater detail with relation to FIG. 8).

As mentioned above, the system environment 100 includes the server device(s) 102. In one or more embodiments, the server device(s) 102 generates, stores, receives, and/or transmits data including notifications, models, and digital images. In one or more embodiments, the server device(s) 102 comprises a data server. In some implementations, the server device(s) 102 comprises a communication server or a web-hosting server.

As shown, the server device(s) 102 includes a document viewing system 104. In one or more embodiments, the document viewing system 104 provides functionality by which a client device (e.g., the client device(s) 110) views, generates, stores, and/or edits digital content based on a content source. Specifically, the document viewing system 104 provides tools for generating or interacting with digital content based on prompts including digital text or digital documents containing text (e.g., PDFs, source code files, etc.). For example, in some instances, a client device sends a digital document to the document viewing system 104 hosted on the server device(s) 102 via the network 108. The document viewing system 104 then provides many options that are usable by the client device to view and/or generate a response to a query about the digital document. To illustrate, the document viewing system 104 provides one or more options that are usable by the client device to input a query regarding the digital document or other relevant digital documents to generate input-guided responses using one or more large language model(s) 114, such as in connection with editing code, summarizing digital documents, or contextual question answering operations.

As further shown, the server device(s) 102 also include the draft prediction generation system 106 for providing responses to queries in connection with interacting with digital documents in the document viewing system 104. In one or more embodiments, the draft prediction generation system 106 generates a response by generating multi-token draft predictions from an input guide text. In particular, as will be explained below, the draft prediction generation system determines candidate draft predictions from the input guide text and selects a draft prediction from among the candidate draft predictions to generate multiple tokens in a response at a single time step of the large language model(s) 114 by leveraging internal hidden states of the large language model(s) 114. Thus, the draft prediction generation system generates a response to a query by generating multi-token draft responses at individual time steps of the large language model(s) 114 based on the input guide text.

As illustrated in FIG. 1, the draft prediction generation system 106 includes large language model(s) 114. Indeed, in these or other embodiments, the draft prediction generation system 106 implements the large language model(s) 114 to generate responses to queries. In some cases, the large language model(s) 114 are external to the draft prediction generation system 106, but the draft prediction generation system 106 nevertheless accesses and utilizes the large language model(s) 114 via one or more plugins, APIs, or other network-based access protocols.

In one or more embodiments, the client device(s) 110 includes a computing device that accesses, edits, segments, modifies, stores, and/or provides, for display, responses generated by the large language model(s) 114. For example, in some embodiments, the client device(s) 110 includes a smartphone, a tablet, a desktop computer, a laptop computer, a head-mounted-display device, or another electronic device, including those explained below with reference to FIG. 8. In some instances, the client device(s) 110 includes one or more applications (e.g., a client application 112) that access, edit, segment, modify, store, and/or provide, for display, responses to queries. For example, in one or more embodiments, the client application 112 includes a software application installed on the client device(s) 110. Additionally, or alternatively, the client application 112 includes a web browser or other application that accesses a software application hosted on the server device(s) 102 (and supported by the document viewing system 104).

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 8.

To provide an example implementation, in some embodiments, the draft prediction generation system 106 on the server device(s) 102 supports the draft prediction generation system 106 on the client device(s) 110. For instance, in some cases, the draft prediction generation system 106 on the server device(s) 102 generates or learns parameters for the large language model(s) 114. The draft prediction generation system 106 then, via the server device(s) 102, provides the large language model(s) 114 to the client device(s) 110. In other words, the client device(s) 110 obtains (e.g., downloads) the large language model(s) 114 from the server device(s) 102. Once downloaded, the draft prediction generation system 106 on the client device(s) 110 uses the large language model(s) 114 to generate a response to a query using the large language model(s) 114 independent of the server device(s) 102.

In alternative implementations, the draft prediction generation system 106 includes a web hosting application that allows the client device(s) 110 to interact with content and services hosted on the server device(s) 102. To illustrate, in one or more implementations, the client device(s) 110 accesses a software application supported by the server device(s) 102. The client device(s) 110 provides input to the server device(s) 102, such as one or more digital documents with digital text or source code that the draft prediction generation system 106 uses as an input guide text. In response, the draft prediction generation system 106 on the server device(s) 102 generates a response to a query using the large language model(s) 114 by leveraging internal hidden states of the large language model(s) 114 to generate responses via speculative decoding. The server device(s) 102 then provides the response to the client device(s) 110 for display.

Although FIG. 1 illustrates the draft prediction generation system 106 implemented with regard to the server device(s) 102, different components of the draft prediction generation system 106 are able to be implemented by a variety of devices within the system environment 100. For example, in some instances, a different computing device (e.g., the client device(s) 110) or a separate server from the server device(s) 102 implements one or more (or all) components of the draft prediction generation system 106. Indeed, as shown in FIG. 1, the client device(s) 110 includes the draft prediction generation system 106. Example components of the draft prediction generation system 106 will be described below with regard to FIG. 6.

As noted previously, in some embodiments, the draft prediction generation system 106 generates responses to queries to an LLM by using hidden states generated by the LLM to perform speculative decoding. For example, FIG. 2 illustrates the draft prediction generation system 106 using an LLM to generate a response by generating a draft prediction from a plurality of candidate draft predictions at a time step of the LLM in accordance with one or more embodiments.

Figure 2:
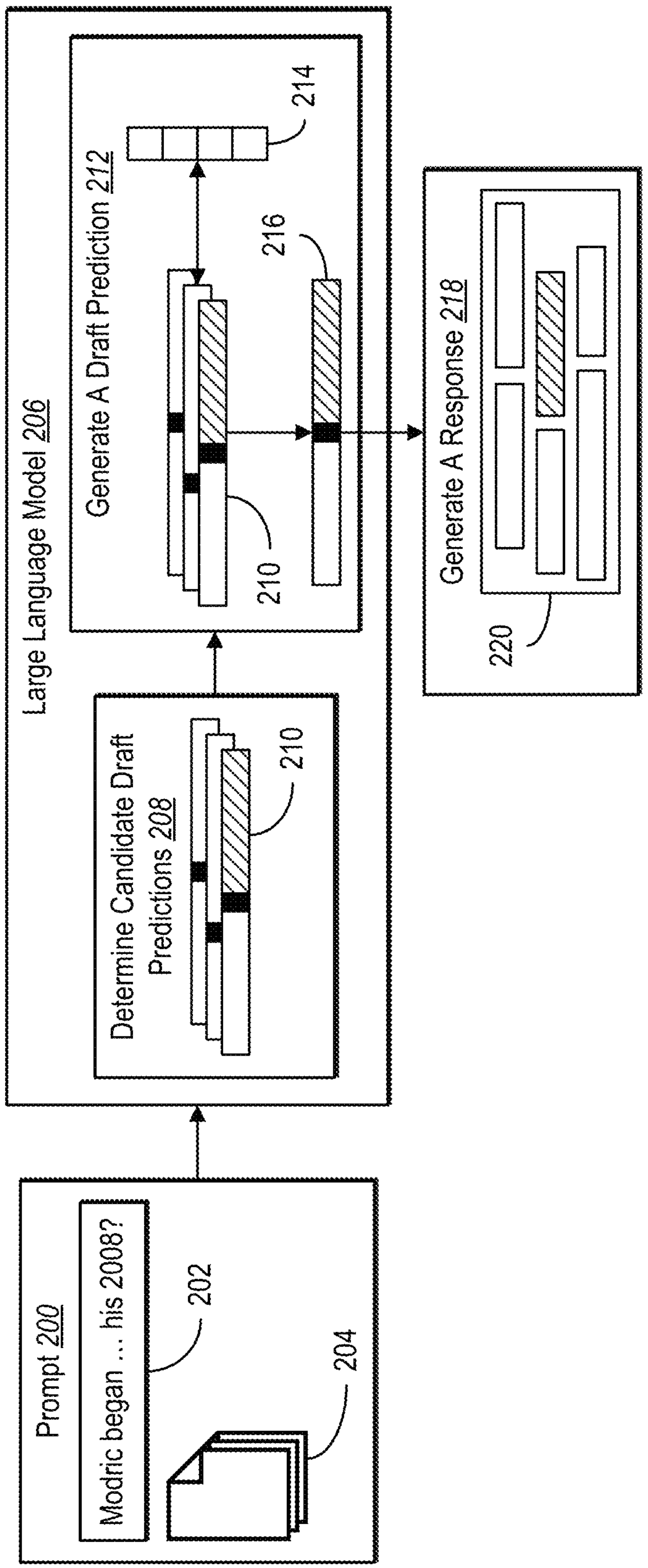
FIG. 2 illustrates an overview diagram of the draft prediction generation system using a large language model to generate a response by generating a draft prediction at a time step of the large language model using hidden states of the large language model in accordance with one or more embodiments.

As illustrated in FIG. 2, in some implementations, the draft prediction generation system 106 determines a prompt 200 to an LLM 206. Specifically, the draft prediction generation system 106 determines the prompt 200, including determining that the prompt 200 includes a query 202 and an input guide text 204. For example, the draft prediction generation system 106 determines the input guide text 204 that is related to the query 202 (e.g., for utilizing the input guide text 204 as a guide for generating a response to the query 202). Additional detail regarding the draft prediction generation system 106 determining the prompt 200 with the query 202 and the input guide text 204 is provided with respect to FIG. 3.

As further illustrated in FIG. 2, in one or more embodiments, the draft prediction generation system 106 performs an act 208 of determining candidate draft predictions 210 using the LLM 206. In particular, the draft prediction generation system 106 uses the LLM 206 to determine the candidate draft predictions 210 by determining token sequences in the input guide text 204 that correspond to a most recent token generated by the LLM 206 for a response 220 to the query 202. For instance, the draft prediction generation system 106 determines locations within the input guide text 204 that include possible token sequences based on the most recent token generated by the LLM 206 to determine token sequences of the candidate draft predictions 210. Indeed, in these or other embodiments, the draft prediction generation system 106 determines each of the candidate draft predictions by determining a plurality of tokens in the input guide text 204 following a matching token. Further detail regarding the draft prediction generation system 106 determining the candidate draft predictions 210 is provided with respect to FIG. 3.

As additionally shown in FIG. 2, in one or more implementations, the draft prediction generation system 106 performs an act 212 of generating a draft prediction 216 using the LLM 206. Specifically, the draft prediction generation system 106 uses the LLM 206 to compare the candidate draft predictions 210 to a hidden state 214 generated by the LLM 206 to identify the candidate draft prediction 210 that most likely corresponds to a partially generated response. For example, in some embodiments, the draft prediction generation system 106 uses the LLM to generate hidden states for tokens associated with the candidate draft predictions 210 such as tokens preceding the token sequences of the candidate draft predictions 210 from the input guide text 204. In these or other embodiments, the draft prediction generation system 106 compares the hidden states of the tokens preceding the token sequences of the candidate draft predictions to the hidden state 214 to generate the draft prediction 216. Additional detail regarding generating the draft prediction 216 is provided with respect to FIGS. 4 and 5.

As further illustrated in FIG. 2, in some implementations, the draft prediction generation system 106 performs an act 218 of generating the response 220 to the query 202. In particular, the draft prediction generation system 106 generates the response 220 using the LLM 206. For instance, the draft prediction generation system 106 uses the LLM 206 to generate the response 220 to include the draft prediction 216. Indeed, in one or more embodiments, the draft prediction generation system 106 generates the response 220 by generating the tokens of the draft prediction at a single time step of the LLM 206. Additional detail regarding generating the response 220 is provided with respect to FIG. 5.

As previously mentioned, in one or more implementations, the draft prediction generation system 106 determines candidate draft predictions, each including a plurality of tokens. Indeed, in some embodiments, the draft prediction generation system 106 determines the candidate draft predictions using hidden states generated by an LLM. FIG. 3 illustrates the draft prediction generation system 106 using hidden states generated by an LLM to determine candidate draft predictions in accordance with one or more embodiments.

As shown in FIG. 3, in some implementations, the draft prediction generation system 106 determines the prompt 200 for the LLM 206. In one or more embodiments, the prompt 200 includes input information for the LLM 206 to guide a response (or output) from the LLM 206. For example, in one or more implementations, the draft prediction generation system 106 determines that the prompt 200 includes a query and/or an input guide text 204 that the LLM 206 processes to generate a response. Specifically, in some embodiments, the query 202 includes a string of text (e.g., in the form of a question or a directive) that serves as the basis for the LLM 206 generating the response.

As previously noted, in one or more embodiments, the draft prediction generation system 106 includes the input guide text 204. In particular, in one or more implementations, the input guide text includes information in addition to the query 202 that the LLM 206 uses to generate a response to the prompt. For example, in some embodiments, the input guide text 204 includes one or more digital documents (e.g., text-based documents, source code files, etc. such as those used for summarization or code editing) and/or text (e.g., in the form of prompts, instructions, queries, and/or responses such as in the context of multi-turn conversation or text editing).

Furthermore, in some implementations, the draft prediction generation system 106 determines the input guide text 204 related to the query 202. For example, in one or more embodiments, the draft prediction generation system 106 determines the input guide text 204 based on the content of the query 202. In these or other embodiments, the draft prediction generation system 106 determines the input guide text 204 based on the inclusion of the input guide text 204 in (or with) the prompt 200, such as via user interaction to attach or insert the input guide text 204. Additionally, or alternatively, the draft prediction generation system 106 determines the input guide text 204 based on the query 202 without additional user interaction, such as by determining digital documents and/or text related to the query 202 given context in the query 202.

As mentioned above, in one or more implementations, the draft prediction generation system 106 determines the prompt 200 for the LLM 206. For example, in some embodiments, the draft prediction generation system 106 determines the prompt 200 from user input via a client device, such as via a chat interface involving a chatbot based on the LLM 206 or an interface that generates and submits prompts to the LLM 206 based on interactions with various tools. In some implementations, the LLM 206 includes an artificial intelligence model capable of processing and generating natural language text or other language-based prompts using language understanding. In particular, in one or more embodiments, the LLM 206 is trained on large amounts of data to learn patterns and rules of language. In particular, a large language model includes parameters trained (e.g., via deep learning) on large amounts of data to learn patterns and rules of language for summarizing and/or generating digital content. In addition, in one or more implementations, the LLM 206 is capable of generating a response that includes token sequences from the input guide text 204. Additionally, in some embodiments, the draft prediction generation system 106 uses LLMs that are not pre-trained for specific tasks, but for general language processing.

As also depicted in FIG. 3, in some implementations, the draft prediction generation system 106 determines candidate draft predictions using the LLM 206. In particular, the draft prediction generation system 106 determines the candidate draft predictions at a time step of the LLM 206. For example, a time step of the LLM 206 is a fundamental unit of processing for an LLM response. Specifically, the time step includes a discrete point in the sequential processing of a response by an LLM. In one or more embodiments, the time step corresponds to a discrete time point in which the LLM 206 generates one or more tokens of a response.

Figure 6:
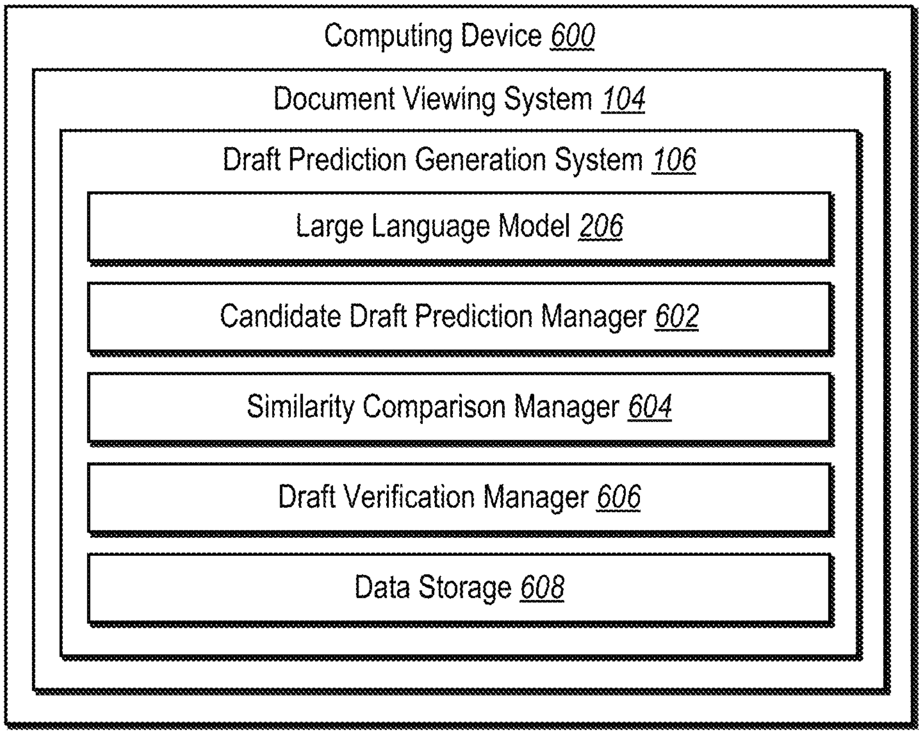
FIG. 6 illustrates an example schematic diagram of the draft prediction generation system in accordance with one or more embodiments.

As noted above, the draft prediction generation system 106 determines the candidate draft predictions at a time step of the LLM 206. To illustrate, as shown in FIG. 6, the LLM 206 has previously generated several tokens of the response 220 including "Luka Modric changed his team to." In this example, the LLM 206 is in the process of generating one or more tokens of the response 220 at a present time step (t). Further, in this example, time steps previous to the current time step are designated by subtracting from the present time step. For example, a most recent token 302 generated by the LLM relative to the present time step is designated as t minus 1 (t−1), a previous token 304 client device(s) 110 the most recent token is designated as t minus 2 (t−2), etc. Specifically, in this example the most recent token 302 is "to", the previous token 304 is "team", etc. As also shown, the draft prediction generation system 106 generates hidden states for each token of the response 220 as discussed in further detail below with respect to FIG. 4.

As further illustrated in FIG. 3, in one or more implementations, the draft prediction generation system 106 determines the candidate draft predictions from token sequences 300 in the input guide text 204. Specifically, the draft prediction generation system 106 determines the candidate draft predictions by determining positions in the input guide text 204 that correspond to the most recent token 302 generated by the LLM 206. For example, the draft prediction generation system 106 performs a search on the input guide text 204 utilizing the most recent token 302 to find possible token sequences. In some embodiments, the draft prediction generation system 106 determines these positions according to Function (1):

$$P = \{j \mid x_j = x_t,\ j < t\} \tag{1}$$

In Function (1), P represents a set of positions of matching tokens 306 (i.e., tokens that match the most recent token 302 generated by the LLM 206) in the input guide text 204. Moreover, in Function 1, j represents each individual position in the set P (i.e., $j \in P$), $x_j$ represents a matching token 306, $x_t$ represents the most recent token 302, and t represents a decoding time step corresponding to a token.

For example, in these or other embodiments, the draft prediction generation system 106 determines the token sequences 300 by determining tokens associated with and surrounding the matching token 306 in the input guide text 204 for inclusion in the token sequences. In one or more embodiments, the draft prediction generation system 106 utilizes a single preceding token immediately prior to the matching token 306 in the input guide text 204 to evaluate the token sequences 300. In one or more embodiments, the draft prediction system 106 includes the preceding token(s) in a token sequence for determining a particular candidate draft prediction.

In one or more implementations, the draft prediction generation system 106 determines a number of tokens that precede the matching token 306 for inclusion in the token sequences 300 for determining candidate draft predictions to optimize overlap of these preceding tokens with token sequences in the prompt 200. To illustrate, the draft prediction generation system 106 determines tokens associated with and preceding the matching token 306 for a first token sequence, "Zagreb in 2003 before spells on loan", for a second token sequence, "his performances earned him a move", and for a third token sequence, "League titles, each time being voted in".

Furthermore, in one or more embodiments, the draft prediction generation system 106 determines tokens that follow the matching token 306 for inclusion in the token sequences 300. Specifically, the draft prediction generation system 106 determines the tokens following the matching token 306 as discussed in further detail in FIG. 5. Additionally, in one or more implementations, the draft prediction generation system 106 determines the token sequences 300 to include the matching token 306 as well as tokens preceding and following the matching token 306. Thus, in one or more embodiments, each token sequence from the input guide text 204 that the draft prediction generation system 106 evaluates includes tokens for candidate draft predictions and one or more additional tokens for evaluating the candidate draft predictions (e.g., including the matching token 306 and one or more preceding tokens).

To illustrate, the draft prediction generation system 106 determines locations in the input guide text 204 based on the most recent token 302, "to", as shown in FIG. 3. In this example, the draft prediction generation system 106 determines three positions in the input guide text 204 with matching tokens 306. These positions are shown in FIG. 3 within the token sequences 300 as follows " . . . Zagreb in 2003 before spells on loan to Bosnian side Zrinjski Mostar and Croatian side," " . . . his performances earned him a move to Premier League club Tottenham Hotspur in 2008," and " . . . League titles, each time being voted into the squad of the season. In total, he has won 26," with the matching tokens 306 underlined.

As mentioned previously, in some embodiments, the draft prediction generation system 106 determines the candidate draft predictions from the token sequences 300 in the input guide text 204. Specifically, the draft prediction generation system 106 determines the candidate draft predictions from tokens in the token sequences 300 following the matching token 306. To illustrate, the draft prediction generation system 106 determines a first candidate draft prediction by finding a first token sequence in the input guide text 204 corresponding to (e.g., following) the most recent token as follows: "Bosnian side Zrinjski Mostar and Croatian side." Similarly, the draft prediction generation system 106 determines second and third candidate draft predictions by finding second and third token sequences, respectively, in the input guide text 204 as follows: "Premier League club Tottenham Hotspur in 2008" and "the squad of the season. In total, he has won 26".

Figure 4:
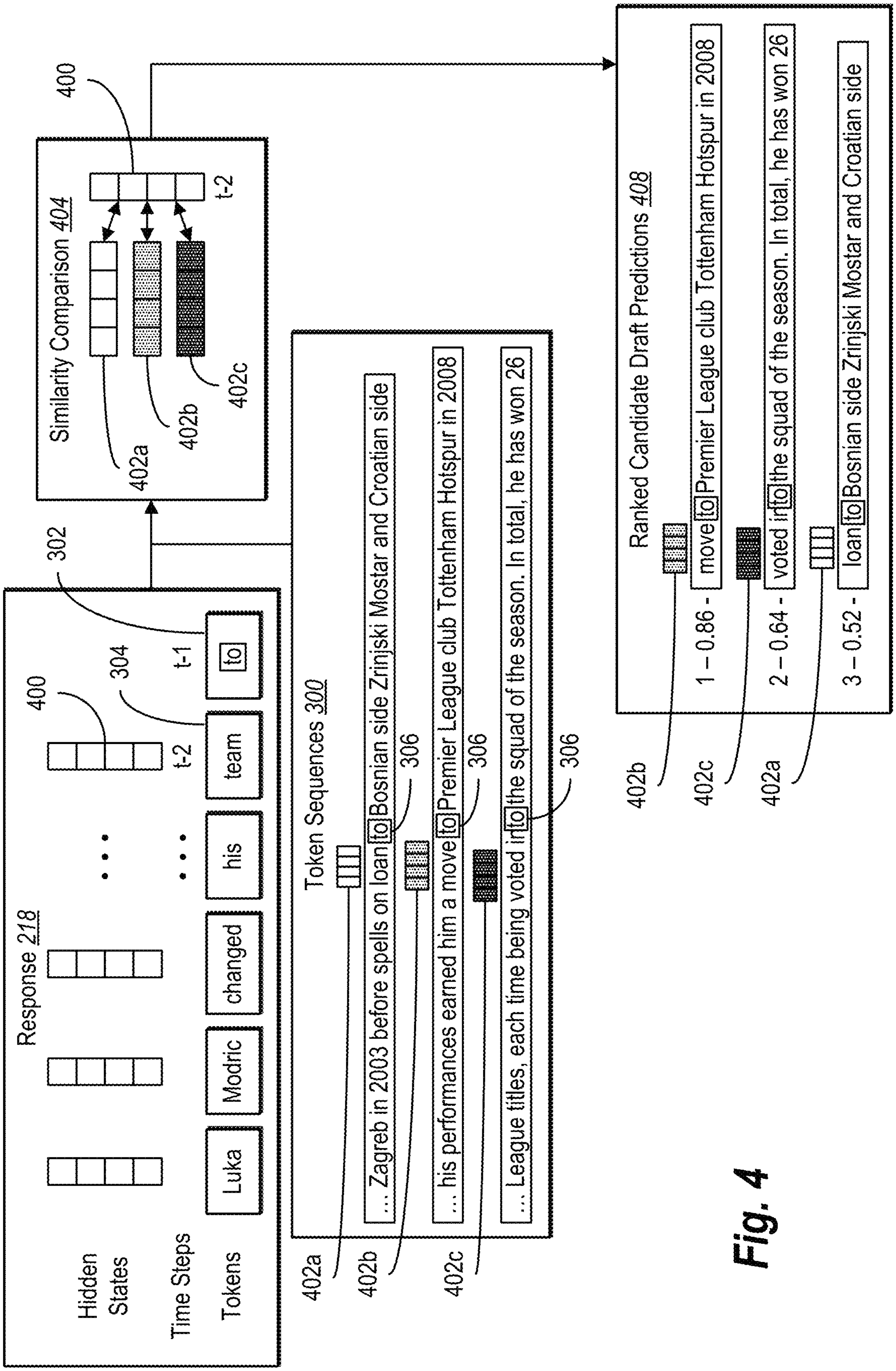
FIG. 4 illustrates a diagram of the draft prediction generation system using a hidden state of a large language model to compare the candidate draft predictions to a most recent token generated by the large language model in accordance with one or more embodiments.

As noted previously, in some implementations, the draft prediction generation system 106 generates a draft prediction including one or more tokens at a single time step of an LLM. Indeed, in one or more embodiments, the draft prediction generation system 106 generates the draft prediction at a time step using hidden states generated by the LLM. FIG. 4 illustrates the draft prediction generation system 106 using hidden states of an LLM to compare candidate draft predictions with a most recent token generated by the LLM in accordance with one or more embodiments.

As portrayed in FIG. 4, in one or more implementations, the draft prediction generation system 106 performs a similarity comparison 404 to compare the candidate draft predictions with the most recent token generated by the LLM. Specifically, to perform the similarity comparison 404 the draft prediction generation system 106 utilizes hidden states that the LLM generates while generating the response 220. For example, in some embodiments, the draft prediction generation system 106 determines a most recent hidden state 400 generated by the LLM in the response 220 to the query 202. In some implementations, the draft prediction generation system 106 determines the most recent hidden state 400 by determining a hidden state of a previous token 304 (generated at time step t−2) prior the most recent token 302 (generated at time step t−1). In one or more embodiments, the draft prediction generation system 106 determines a layer of the LLM from which to determine the hidden state 400 based on a hyperparameter of the LLM. To illustrate, the draft prediction generation system 106 determines the hyperparameter via hyperparameter tuning in conjunction with a hyperparameter for a number of draft tokens.

As additionally shown in FIG. 4, in one or more implementations, the draft prediction generation system 106, to perform the similarity comparison 404, the draft prediction generation system 106 compares tokens associated with the candidate draft predictions to the hidden state 400. In particular, the draft prediction generation system 106 uses tokens of the token sequences 300 preceding the candidate draft predictions to select the tokens for comparing to the hidden state 400. To illustrate, the draft prediction generation system 106 determines and uses one or more tokens of the token sequences 300 that precede the matching token 306, "to". To further illustrate, in some embodiments, the draft prediction generation system 106 uses one or more of the tokens within the text "Zagreb in 2003 before spells on loan" for the first candidate draft prediction, one or more of the tokens within the text "his performances earned him a move" for the second candidate draft prediction, and one or more of the tokens within the text "League titles, each time being voted in" for the third candidate draft prediction. In one or more embodiments, as described in more detail below, the draft prediction generation system 106 uses the previous token immediately before the matching tokens 306 in each of the token sequences 300 to perform the similarity comparison 404. In alternative embodiments, the draft prediction generation system 106 uses more than one token preceding the matching tokens 306 in the token sequences 300 to perform the similarity comparison 404. Indeed, in these or other embodiments, the draft prediction generation system 106 compares these tokens (e.g., hidden states representing these tokens) to the hidden state 400 of the previous token 304 client device(s) 110 the most recent token 302 to perform the similarity comparison 404.

In some implementations, to compare the tokens of the token sequences 300 that precede the matching token 306 to the hidden state 400, the draft prediction generation system 106 generates hidden states for the tokens preceding the matching token 306. Specifically, the draft prediction generation system 106 generates these hidden states according to the input guide text while processing the input guide text according to the prompt to the LLM. To illustrate, in one or more embodiments, the draft prediction generation system 106 generates hidden states for the tokens preceding the matching token 306 in the first token sequence 300 by generating hidden states for the tokens within the text "Zagreb in 2003 before spells on loan." Similarly, the draft prediction generation system 106 determines hidden states for the tokens preceding the matching token 306 of each of the second and third token sequences 300.

In one or more implementations, the draft prediction generation system 106 compares a single token associated with each of the candidate draft predictions to the hidden state 400. For example, in some embodiments, the draft prediction generation system 106 determines a comparison token from the input guide text associated with each of the candidate draft predictions. Indeed, in some implementations, the draft prediction generation system 106 determines the comparison token from the tokens in the token sequences 300 preceding the matching token 306. For example, the draft prediction generation system 106 determines the comparison token as the token preceding the matching token 306.

To illustrate, the draft prediction generation system 106 determines a comparison token "loan" associated with the first candidate draft prediction. Similarly, the draft prediction generation system 106 determines comparison tokens "move" and "voted" for the second and third candidate draft predictions, respectively. In these or other embodiments, the draft prediction generation system 106 uses these comparison tokens for the similarity comparison 404.

In additional examples, the draft prediction generation system 106 determines more than one comparison token for each token sequence for the similarity comparison 404. For example, the draft prediction system 106 selects a plurality of tokens prior to the matching token in a token sequence and compares hidden states of the plurality of selected tokens to one or more hidden states that the LLM used to generate the tokens in the response 218. To illustrate, the draft prediction generation system 106 selects two previous tokens in each token sequence and compares the hidden states of the two previous tokens to the hidden state 400 at t−2 and a hidden state at t−3 (e.g., by comparing the hidden state of the token immediately before the matching token to the hidden state 400 at t−2 and the hidden state of the second to last token before the matching token to the hidden state at t−3).

As further illustrated in FIG. 4, in one or more embodiments, to perform the similarity comparison 404, the draft prediction generation system 106 compares the hidden states 402*a*-402*c* of the comparison tokens to the hidden state 400 of the previous token 304 client device(s) 110 the most recent token 302 generated by the LLM. Specifically, the draft prediction generation system 106 determines the hidden states 402*a*-402*c* generated by the LLM for the comparison tokens. The draft prediction generation system 106 uses these hidden states 402*a*-402*c* to perform the similarity comparison 404. In one or more implementations, the draft prediction generation system 106 determines the hidden states 402*a*-402*c* from the same layer of the LLM from which the draft prediction generation system 106 determines the hidden state 400 of the previous token 304.

As previously mentioned, in some embodiments, the draft prediction generation system 106 performs the similarity comparison 404. Indeed, via the similarity comparison 404, the draft prediction generation system 106 determines a similarity between tokens and/or hidden states thereof. Specifically, a similarity refers to a metric or value indicating likeness, relatedness, or similarity. For instance, a similarity refers to a metric indicating relatedness between two hidden states. To illustrate, the draft prediction generation system 106 determines the similarity by comparing each of the hidden states 402*a*-402*c* of the comparison tokens to the hidden state 400 of the previous token 304 client device(s) 110 the most recent token 302 generated by the LLM. In some implementations, the draft prediction generation system 106 determines the similarity by performing a similarity comparison such as a cosine similarity comparison. In these or other embodiments, the draft prediction generation system 106 determines a cosine similarity between each of the hidden states 402*a*-402*c* and the hidden state 400.

As also depicted in FIG. 4, in one or more embodiments, the draft prediction generation system 106 determines rankings of the candidate draft predictions. In particular, based on the similarity comparison 404, the draft prediction generation system 106 determines ranked candidate draft predictions 408. For instance, the draft prediction generation system 106 ranks the candidate draft predictions based on the similarity (e.g., a cosine similarity) of the hidden states 402*a*-402*c* of the comparison tokens 306 associated with the candidate draft prediction.

To illustrate, the draft prediction generation system 106 determines that the hidden state 402*b* of the comparison token "move" associated with the second candidate draft prediction has a highest cosine similarity of 0.86 with the hidden state 400 and ranks it first. Further, in this example, the draft prediction generation system 106 determines that the hidden state 402*c* of the third candidate draft prediction and the hidden state 402*a* of the first candidate draft prediction have respective cosine similarities of 0.64 and 0.52 with the hidden state 400. Accordingly, the draft prediction generation system 106 ranks the third candidate draft prediction as second and the first candidate draft prediction as third.

Figure 5:
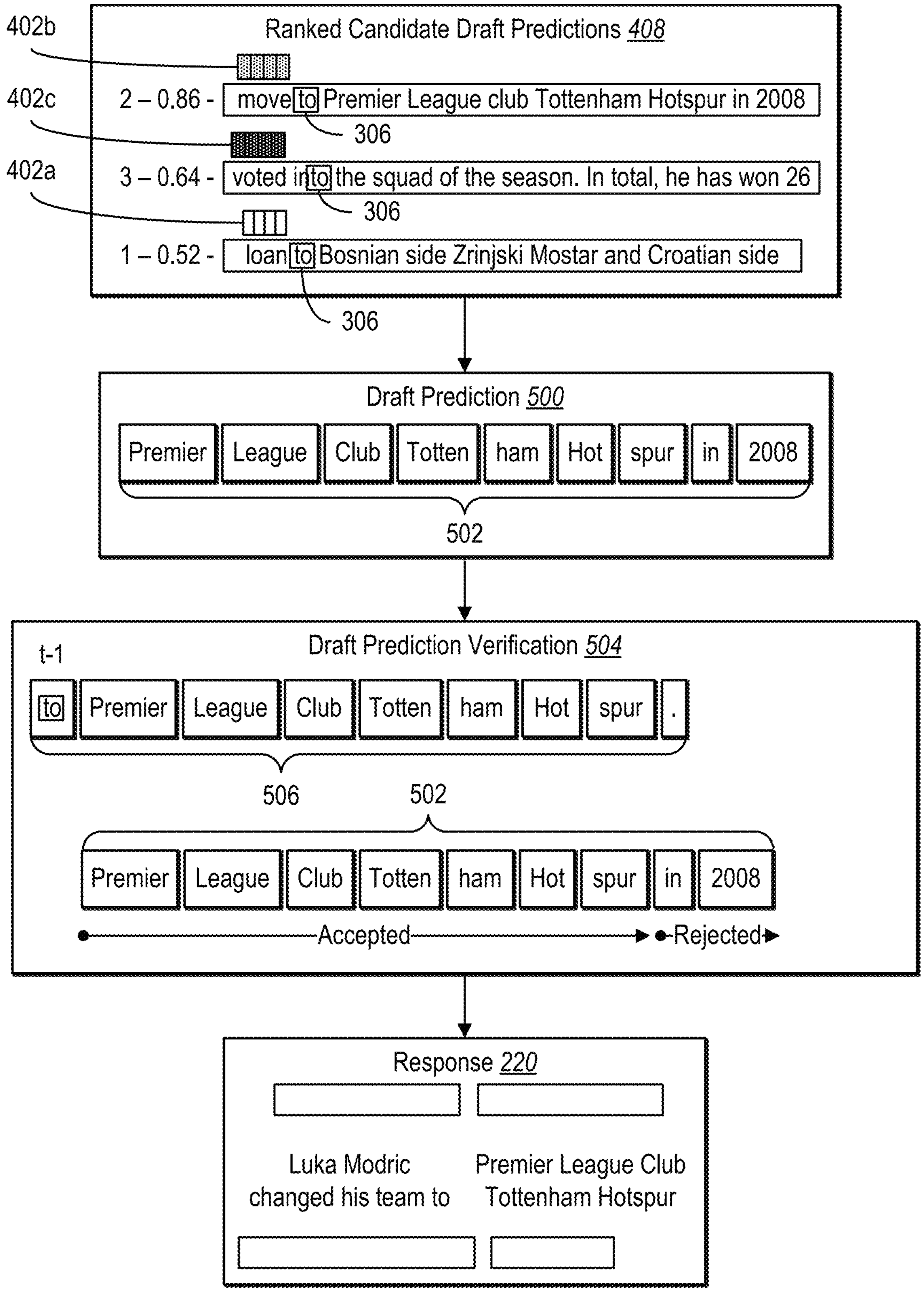
FIG. 5 illustrates a diagram of the draft prediction generation system generating a response including tokens of a selected draft prediction in accordance with one or more embodiments.

As previously noted, in one or more implementations, the draft prediction generation system 106 selects one of the candidate draft predictions as a draft prediction. Indeed, in some embodiments, the draft prediction generation system 106 determines a selected draft prediction and generates a response to include the selected draft prediction. FIG. 5 illustrates the draft prediction generation system 106 generating a response including tokens of a selected draft prediction in accordance with one or more embodiments.

As depicted in FIG. 5, in some implementations, the draft prediction generation system 106 utilizes the ranked candidate draft predictions 408 to determine a selected candidate draft prediction. Specifically, the draft prediction generation system 106 determines the selected candidate draft prediction based on the similarity score with the most recent hidden state generated by the LLM in the response. For example, in one or more embodiments, the draft prediction generation system 106 selects the candidate draft prediction with the highest cosine similarity to the hidden state of the previous token prior to the most recent token. To illustrate, the draft prediction generation system 106 selects the second candidate draft prediction with the highest cosine similarity (e.g., 0.86) as the selected candidate draft prediction.

As further illustrated in FIG. 5, in one or more implementations, the draft prediction generation system 106 determines draft tokens 502 in the selected candidate draft prediction for inclusion in the draft prediction 500. In particular, the draft prediction generation system 106 determines the draft tokens from tokens following the matching token 306 associated with the selected candidate draft prediction. To illustrate, following the matching token "to", the selected candidate draft prediction includes text "Premier League club Tottenham Hotspur in 2008". In this example, the draft prediction generation system 106 determines the draft tokens 502 from this tokenized text for inclusion in the draft prediction 500. Indeed, in these or other embodiments, the draft prediction generation system 106 generates the draft prediction 500 to include the draft tokens 502, "Premier", "League", "club", "Totten", "ham", "Hot", "spur", "in", and "2008".

In some embodiments, the draft prediction generation system 106 determines a number of the draft tokens 502 for inclusion in the draft prediction 500. Specifically, in some implementations, the draft prediction generation system 106 determines the number of draft tokens 502 according to a predetermined number of tokens. For example, in one or more embodiments, the draft prediction generation system 106 determines the number of draft tokens 502 according to a predetermined number of tokens indicated by a hyperparameter of the LLM. To illustrate, as previously mentioned, the draft prediction generation system 106 determines the hyperparameter for the number of tokens in conjunction with a hyperparameter for determining a hidden state layer (e.g., for using generated hidden states in the similarity comparison operations). In one or more embodiments, the draft prediction generation system 106 determines the hyperparameters via tuning by alternately fixing the hyperparameters to choose the best values for each.

Additionally, or alternatively, in one or more implementations, the draft prediction generation system 106 determines the predetermined number of draft tokens based on an average number of tokens accepted during verification. In these or other embodiments, the draft prediction generation system 106 determines the average number of tokens accepted by a verification model from a plurality of draft predictions (e.g., at different time steps of a response generated by the LLM or across a plurality of different response generation operations using the LLM).

As additionally shown in FIG. 5, in some embodiments, the draft prediction generation system 106 generates the response 220 by performing draft prediction verification 504. Specifically, the draft prediction generation system 106 verifies the draft tokens 502 of the draft prediction 500. For example, the draft prediction generation system 106 verifies the draft tokens 502 against new tokens generated by the LLM (i.e., actual LLM generation tokens 506). Indeed, in these or other embodiments, the draft prediction generation system 106 uses a verification model to accept and/or reject the draft tokens 502.

In some implementations, as shown in FIG. 5, the draft prediction generation system 106 verifies the draft tokens 502 against the actual LLM generation tokens 506. Specifically, the draft prediction generation system 106 compares each of the draft tokens 502 against a corresponding actual LLM generation token 506. In these or other embodiments, when a draft token 502 and the corresponding actual LLM generation token match, the draft prediction generation system 106 accepts the draft token 502. Conversely, when a draft token 502 does not match the corresponding actual LLM generation token 506, the draft prediction generation system 106 rejects the draft token 502.

As just described, the draft prediction generation system 106 accepts and/or rejects the draft tokens 502 based on the new actual LLM generation tokens 506. To illustrate, as depicted in FIG. 5, the draft prediction generation system 106 accepts the first seven of the draft tokens 502 (i.e., from "Premier" through "spur"). Conversely, the draft prediction generation system 106 rejects the last two of the draft tokens 502 (i.e., "in" and "2008"). Moreover, in one or more embodiments, the draft prediction generation system 106 performs the draft prediction verification 504 just described in parallel. As such, in these or other embodiments, the draft prediction generation system 106 generates the draft tokens 502 accepted from the draft prediction 500 at the present time step (t) of the LLM. Indeed, the draft prediction generation system 106 generates the response 220, in part, by generating the draft tokens 502 accepted from the draft prediction 500 at the present time step (t) of the LLM.

As mentioned above, in one or more implementations, the draft prediction generation system 106 performs the draft prediction verification 504 using a verification model. For example, the draft prediction generation system 106 uses the verification model to verify the correctness or quality of a partial LLM output. Specifically, in some embodiments, the draft prediction generation system 106 uses the verification model to verify draft predictions generated by the LLM. For example, in some implementations, the verification model includes a greedy decoding verification algorithm or a rejection sampling verification algorithm. Indeed, in one or more embodiments, the draft prediction generation system 106 uses the following greedy decoding verification algorithm:

$$\hat{x}_i = \underset{x \in V}{\operatorname{argmax} M_q} (x \mid x_{\le t}, \hat{x}_{<i}),\ i = 1, \ldots K+1$$

In the greedy decoding verification algorithm, x represents the draft tokens 502, $M_q$ represents the LLM, x represents the input sequence at a decoding step t, V represents the set of verified (i.e., accepted tokens), and K represents the number of draft tokens 502. In one or more implementations, the greedy decoding verification algorithm determines each of the actual LLM generation tokens 506 with a highest probability as determined by the LLM for verification against the corresponding draft token 502.

To illustrate, as shown in FIG. 5, of the possible actual LLM generation tokens 506 for the first position following the most recent token, "to", the LLM determines that "Premier" has a highest probability. Accordingly, in this example, the greedy decoding verification algorithm selects "Premier" as the actual LLM generation token 506 and compares it with the first draft token "Premier." Using the greedy decoding verification algorithm, the draft prediction generation system 106 determines that these tokens match and accepts the draft token "Premier." In contrast, using the greedy decoding verification algorithm, the draft prediction generation system 106 determines that the actual LLM generation token 506 following "spur" is "." and therefore rejects the draft token "in" which does not match and the subsequent draft token "2008".

As noted above, in some embodiments, the draft prediction generation system 106 uses a rejection sampling verification to perform the draft prediction verification 504. For example, the draft prediction generation system 106 uses the rejection sampling algorithm to accept or reject the draft tokens 502 of the draft prediction 500. Specifically, rather than selecting a token with the highest probability as the actual LLM generation token for a given position, the rejection sampling algorithm selects a token from the probability distribution as the actual LLM generation token 506 for each position. In these or other embodiments, the draft prediction generation system 106 uses these selections in a similar manner as described above with respect to the greedy decoding verification algorithm.

As further illustrated in FIG. 5 and as mentioned previously, in some implementations, the draft prediction generation system 106 generates the response 220 for the prompt 200 to include the draft prediction. In particular, the draft prediction generation system 106 generates the response 220 to include the draft tokens 502 accepted at the draft prediction verification 504. For example, the draft prediction generation system 106 generates the draft tokens 502 at a single time step of the LLM as described above. Furthermore, in one or more embodiments, the draft prediction generation system 106 performs the actions described above with respect to FIGS. 1-5 for a plurality of time steps of the LLM to generate the response 220.

To illustrate, as shown in FIG. 5, the draft prediction generation system 106 generates the response 220 to include the draft tokens 502 accepted during the draft prediction verification. Indeed, the draft prediction generation system 106 generates the response 220 to include the tokens "Premier", "League", "club", "Totten", "ham", "Hot", "spur" in addition to the tokens already generated. Thus, the draft prediction generation system 106 generates the response 220 to include the text string "Luka Modric changed his team to Premier League Club Tottenham Hotspur."

Turning to FIG. 6, additional detail will now be provided regarding various components and capabilities of the draft prediction generation system 106. In particular, FIG. 6 illustrates an example schematic diagram of a computing device 600 (e.g., the server device(s) 102 and/or the client device(s) 110) implementing the draft prediction generation system 106 in accordance with one or more embodiments of the present disclosure for components 600-608. As illustrated in FIG. 6, the draft prediction generation system 106 includes a large language model 206, a candidate draft prediction manager 602, a similarity comparison manager 604, a draft verification manager 606, and data storage 608.

The LLM 206 determines a prompt to generate a response to the prompt. For example, the LLM 206 determines a prompt comprising a query and an input guide text related to the query. Based on the query and the input guide text, in one or more implementations, the LLM 206 generates a response including a draft prediction. Specifically, the LLM 206 generates the response to the query by generating tokens of the draft prediction at a time step of the LLM 206. Additionally, in some embodiments, the LLM 206 interacts with other components to generate the response to the prompt.

The candidate draft prediction manager 602 determines candidate draft predictions at a time step of the LLM 206. Specifically, the candidate draft prediction manager 602 accesses the input guide text of the prompt to determine the candidate draft predictions from token sequences in the input guide text. Further, in some implementations, the candidate draft prediction manager 602 accesses the response generated by the LLM 206 to determine a most recent token generated by the LLM 206. In these or other embodiments, the candidate draft prediction manager 602 determines token sequences in the input guide text that correspond to the most recent token generated by the LLM 206. Moreover, in one or more embodiments, the candidate draft prediction manager 602 passes the candidate draft predictions to other components of the draft prediction generation system 106 for further processing.

The similarity comparison manager 604 generates a draft prediction from the candidate draft predictions. For example, the similarity comparison manager 604 receives the candidate draft predictions from the candidate draft prediction manager 602. Furthermore, in one or more implementations, the similarity comparison manager 604 accesses hidden states of tokens associated with the candidate draft predictions to perform a similarity comparison. For example, the similarity comparison manager 604 performs the similarity comparison by determining the most recent hidden state generated by the LLM and comparing the hidden states of the tokens associated with the candidate draft predictions to the most recent hidden state generated by the LLM in the response (e.g., to the hidden state of a previous token prior to the most recent token generated by the LLM in the response). In some embodiments, the similarity comparison manager 604 selects a candidate draft prediction with the highest similarity to the most recent hidden state as the draft prediction. Additionally, in some implementations, the similarity comparison manager 604 passes the draft prediction to other components of the draft prediction generation system 106 for further processing.

The draft verification manager 606 verifies the draft tokens of the draft prediction. For example, the draft verification manager 606 receives the draft prediction from the similarity comparison manager 604. Further, in one or more embodiments, the draft verification manager 606 verifies the draft tokens of the draft prediction against tokens generated by the LLM. Specifically, the draft verification manager verifies each of the draft tokens against the actual LLM generation tokens to accept or reject each token. In one or more implementations, the draft verification manager 606 interacts with the LLM 206 to generate the response to include the draft tokens of the draft prediction.

As just mentioned, the LLM 206 interacts with the draft verification manager 606 to generate the response to include draft tokens of the draft prediction. For example, in some embodiments, the based on the draft verification manager 606 determining which draft tokens of the draft prediction are accepted, the LLM 206 uses the accepted draft tokens to generate the response. Specifically, in some implementations, the LLM 206 generates the accepted draft tokens at a time step of the LLM 206 as part of generating the response to the query of the prompt.

The data storage 608 stores digital text, digital documents, generated tokens and hidden states, token sequences, similarity comparison scores, candidate draft predictions, draft predictions, algorithms, functions, etc. For example, the data storage 608 stores input guide text such as digital text and digital documents from the prompt and/or from various dataset and stores. Moreover, the data storage 608 stores determined candidate draft predictions, selected draft predictions, token sequences of the input guide text, generated tokens and hidden states as well as algorithms and functions utilized by the draft prediction generation system 106.

Each of the components 602-608 of the draft prediction generation system 106 can include software, hardware, or both. For example, the components 602-608 can include one or more instructions stored on a computer-readable storage medium and executable by processors of one or more computing devices, such as a client device or server device. When executed by the one or more processors, the computer-executable instructions of the draft prediction generation system 106 cause the computing device(s) to perform the methods described herein. Alternatively, the components 602-608 include hardware, such as a special-purpose processing device to perform a certain function or group of functions. Alternatively, the components 602-608 of the draft prediction generation system 106 include a combination of computer-executable instructions and hardware.

Furthermore, the components 602-608 of the draft prediction generation system 106 are, for example, implemented as one or more operating systems, as one or more stand-alone applications, as one or more modules of an application, as one or more plug-ins, as one or more library functions or functions that may be called by other applications, and/or as a cloud-computing model. Thus, in various embodiments, the components 602-608 of the draft prediction generation system 106 are implemented as a stand-alone application, such as a desktop or mobile application. Furthermore, in various embodiments, the components 602-608 of the draft prediction generation system 106 are implemented as one or more web-based applications hosted on a remote server. Alternatively, or additionally, the components 602-608 of the draft prediction generation system 106 are implemented in a suite of mobile device applications or "apps." For example, in one or more embodiments, the draft prediction generation system 106 comprises or operates in connection with digital software applications such as ADOBE® EXPERIENCE PLATFORM or ADOBE® ANALYTICS.

As noted previously, in one or more embodiments, the draft prediction generation system 106 improves the efficiency (as well as accuracy and flexibility) of using an LLM to generate responses to prompts/queries relative to both autoregressive decoding approaches and conventional systems that use speculative decoding approaches. Indeed, in one or more implementations, the draft prediction generation system 106 improves efficiency by using hidden states of the LLM to generate draft predictions when drafting the response. Table 1 illustrates relative response generation speedup achieved by the draft prediction generation system 106 compared with conventional systems in accordance with one or more embodiments.

TABLE 1

| System | Summarization | Code Editing | Text Editing (Short) | Text Editing (Long) |
|---|---|---|---|---|
| Autoregressive Decoding System | 1.00 ± 0.00 | 1.00 ± 0.00 | 1.00 ± 0.00 | 1.00 ± 0.00 |
| Conventional System 1 | 1.41x ± 0.02 | 1.84x ± 0.03 | 1.43x ± 0.04 | 1.6x ± 0.03 |
| Conventional System 2 | 2.62x ± 0.02 | 2.43x ± 0.04 | 2.73x ± 0.02 | 3.11x ± 0.06 |
| Draft Prediction Generation System 106 | 3.15x ± 0.07 | 3.44x ± 0.02 | 3.65x ± 0.09 | 4.59x ± 0.17 |

As shown in table 1, in some embodiments, the draft prediction generation system 106 achieves the greatest response generation speedup relative to autoregressive decoding. For example, table 1 shows an autoregressive decoding system as the baseline against which the speculative decoding models were measured. As shown, Conventional System 1 (e.g., as described by He et al., 2023—Rest: Retrieval-based speculative decoding. arXiv preprint arXiv: 2311.08252) performed the various tasks (i.e., summarization, code editing, text editing (short), and text editing (long) significantly faster than the Autoregressive Decoding System. Specifically, for each task, Conventional System 1 performed at least 1.41±0.02 times faster than the Autoregressive Decoding System. Conventional System 2 (e.g., as described by Yang et al., 2023—Inference with reference: Lossless acceleration of large language models. arXiv preprint arXiv:2304.04487) performed the tasks even faster by doing so at least 2.43±0.04 times faster than the Autoregressive Decoding System. The draft prediction generation system 106, however, improved over both of the speculative decoding conventional systems by performing each of the tasks significantly faster than either of the conventional systems, as shown in table 1.

As previously mentioned, the draft prediction generation system 106 also improves the accuracy of generating responses to prompts/queries relative to other speculative decoding systems. As also mentioned above, the draft prediction generation system 106 improves the accuracy by using the hidden states of the LLM to generate draft predictions when drafting the response. For example, in some instances, the draft prediction generation system 106 generates a draft prediction using a cosine similarity wherein the draft tokens of the draft prediction are accepted that would not otherwise be accepted.

To illustrate, in a code editing/generation example, the draft prediction generation system 106 was compared against Conventional System 2. For a line of code "if (intervals.empty( )) return 0; \n\n", Conventional System 2 used a string matching approach to predict a candidate span of tokens with the longest matching prefix. The candidate span of tokens, however, was rejected by the verification algorithm. In contrast, while the draft prediction generation system 106 identified this same candidate span of tokens as a candidate draft prediction, the draft prediction generation system 106 did not select it as the draft prediction because it had a cosine similarity of 0.41 with the hidden state of the last generated token "\n". In this example, the draft prediction generation system 106 selected a second candidate draft prediction with a cosine similarity of 0.83 with the hidden state of the last generated token, which was accepted by the verification algorithm.

FIGS. 1-6, the corresponding text, and the examples provide a number of different systems, methods, and non-transitory computer readable media for generating multiple tokens of an LLM response at a time step of the LLM using a draft prediction selected via hidden states generated by the LLM in accordance with one or more embodiments. In addition to the foregoing, embodiments can also be described in terms of flowcharts comprising acts for accomplishing a particular result. For example, FIG. 7 illustrates a flowchart of an example sequence of acts in accordance with one or more embodiments.

While FIG. 7 illustrates acts according to some embodiments, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7. Additionally, the acts described herein may be repeated or performed in parallel with one another or in parallel with different instances of the same or other similar acts.

FIG. 7 illustrates an example series of acts 700 for generating multiple tokens of large language model response at a time step of the large language model using a draft prediction selected via hidden states generated by the large language model. The series of acts 700 can include an act 702 of determining, for a large language model, a prompt comprising a query and an input guide text related to the query; an act 704 of determining one or more candidate draft predictions from the input guide text; an act 706 of determining one or more token sequences in the input guide text that comprise a most recent token generated by the large language model; an act 708 of generating, at a time step of the large language model, a draft prediction from the one or more candidate draft predictions; an act 710 of comparing tokens associated with the one or more candidate draft predictions to a most recent hidden state generated by the large language model; an act 712 of selecting a candidate draft prediction with a highest similarity to the most recent hidden state; and an act 714 of generating, for the prompt, a response comprising the draft prediction for display via a client device.

In some embodiments, the series of acts 700 includes determining, by at least one processor for a large language model, a prompt including a query and an input guide text related to the query. In some implementations, the series of acts 700 also includes an act of determining, by the at least one processor at a time step of the large language model, one or more candidate draft predictions from one or more token sequences in the input guide text that correspond to a most recent token generated by the large language model. In one or more embodiments, the series of acts 700 further includes an act of generating, by the at least one processor at the time step of the large language model, a draft prediction by comparing tokens associated with the one or more candidate draft predictions to a hidden state of a previous token prior to the most recent token. Additionally, in one or more implementations, the series of acts 700 includes an act of generating, by the at least one processor and for display via a client device, a response including the draft prediction for the prompt to the large language model.

In some implementations, the series of acts 700 includes generating, using the large language model, hidden states for the tokens associated with the one or more candidate draft predictions according to the input guide text. In one or more embodiments, generating the draft prediction by comparing the tokens associated with the one or more candidate draft predictions to the hidden state of the previous token prior to the most recent token includes comparing the hidden states for the tokens associated with the one or more candidate draft predictions to the hidden state of the previous token prior to the most recent token.

In one or more implementations, comparing the tokens associated with the one or more candidate draft predictions to the hidden state of the previous token prior to the most recent token includes determining, from the input guide text and for a candidate draft prediction of the one or more candidate draft predictions, a comparison token 1-6 a token matching the most recent token generated by the large language model. In some embodiments, the series of acts 700 also includes an act of determining, using the large language model, a hidden state of the comparison token. In some implementations, the series of acts 700 further includes an act of comparing the hidden state of the comparison token to the hidden state of the previous token prior to the most recent token.

In some embodiments, generating the draft prediction by comparing the tokens associated with the one or more candidate draft predictions to the hidden state of the previous token prior to the most recent token includes determining, using a cosine similarity comparison, a selected candidate draft prediction from among the one or more candidate draft predictions by determining that the selected candidate draft prediction has a highest cosine similarity to the hidden state of the previous token prior to the most recent token.

In some implementations, generating the draft prediction further includes determining, for inclusion in the draft prediction, a plurality of draft tokens in the selected candidate draft prediction following a matching token associated with the selected candidate draft prediction, wherein the matching token corresponds to the most recent token generated by the large language model.

In one or more embodiments, generating the response including the draft prediction includes generating, using a verification model, the response by verifying a plurality of draft tokens in the draft prediction against new tokens generated by the large language model. In one or more implementations, generating the response including the draft prediction includes generating the plurality of draft tokens accepted from the draft prediction at the time step of the large language model.

In some embodiments, the series of acts 700 includes determining, at a time step for a large language model and from a prompt including a query and an input guide text related to the query, one or more candidate draft predictions from one or more token sequences in the input guide text based on a most recent token generated by the large language model. Additionally, in one or more embodiments, the series of acts 700 includes an act of generating, at the time step of the large language model, a draft prediction by. In one or more implementations, the series of acts 700 also includes an act of determining a most recent hidden state generated by the large language model in response to the query. In some embodiments, the series of acts 700 further includes an act of comparing tokens associated with the one or more candidate draft predictions to the most recent hidden state. Additionally, in some implementations, the series of acts 700 includes an act of selecting, from the one or more candidate draft predictions, a candidate draft prediction with a highest similarity to the most recent hidden state. In one or more embodiments, the series of acts 700 also includes an act of generating, for display via a client device, a response including the draft prediction for the prompt to the large language model.

In some implementations, comparing the tokens associated with the one or more candidate draft predictions to the most recent hidden state includes generating, using the large language model, hidden states for one or more tokens associated with the one or more candidate draft predictions based on the input guide text. In one or more implementations, the series of acts 700 further includes an act of comparing the hidden states for the one or more tokens associated with the one or more candidate draft predictions to the most recent hidden state to determine the candidate draft prediction with the highest similarity to the most recent hidden state.

In one or more embodiments, the series of acts 700 includes generating the draft prediction by determining a plurality of draft tokens in the selected candidate draft prediction for inclusion in the draft prediction according to a predetermined number of draft tokens indicated by a hyperparameter of the large language model. In one or more implementations, determining the plurality of draft tokens in the selected candidate draft prediction for inclusion in the draft prediction includes determining the plurality of draft tokens from one or more tokens that follow a matching token associated with the selected candidate draft prediction that corresponds to the most recent token generated by the large language model.

In some embodiments, the series of acts 700 includes determining the predetermined number of draft tokens based on an average number of tokens accepted, via a verification model, from a plurality of draft predictions. In some implementations, the series of acts 700 includes generating the response including the draft prediction for the prompt to the large language model by rejecting, using a verification model, one or more draft tokens in the draft prediction based on new tokens generated by the large language model utilizing a greedy decoding verification algorithm or a rejection sampling verification algorithm.

In one or more embodiments, the series of acts 700 includes generating the draft prediction by determining a first candidate draft prediction by finding a first token sequence in the input guide text corresponding to the most recent token generated by the large language model. Additionally, in some embodiments, the series of acts 700 includes an act of determining a second candidate draft prediction by finding a second token sequence in the input guide text corresponding to the most recent token generated by the large language model. In some implementations, the series of acts 700 also includes an act of comparing at least one token associated with the first candidate draft prediction and at least one token associated with the second candidate draft prediction to the most recent hidden state. In one or more embodiments, the series of acts 700 further includes an act of selecting the first candidate draft prediction in response to determining that the at least one token associated with the first candidate draft prediction has a highest similarity to the most recent hidden state.

In one or more implementations, the series of acts 700 includes determining, for a large language model, a prompt including a query and an input guide text related to the query. Additionally, in one or more implementations, the series of acts 700 includes an act of determining, at a time step of the large language model, one or more candidate draft predictions from one or more token sequences in the input guide text that correspond to a most recent token generated by the large language model. In some embodiments, the series of acts 700 also includes an act of generating, at the time step of the large language model, a draft prediction by. In some implementations, the series of acts 700 further includes an act of determining a most recent hidden state generated by the large language model in response to the query. Additionally, in one or more embodiments, the series of acts 700 includes an act of selecting, from the one or more candidate draft predictions, a candidate draft prediction by comparing tokens of the one or more candidate draft predictions to the most recent hidden state. In one or more implementations, the series of acts 700 also includes an act of generating, for display via a client device, a response including the draft prediction for the prompt to the large language model.

In some embodiments, the series of acts 700 includes generating, using the large language model, hidden states for one or more tokens associated with the one or more candidate draft predictions that precede tokens of the one or more candidate draft predictions that correspond to the most recent token generated by the large language model. In some implementations, determining the most recent hidden state generated by the large language model in response to the query includes determining a hidden state of a previous token prior to the most recent token generated by the large language model. In one or more embodiments, comparing tokens of the one or more candidate draft predictions to the most recent hidden state includes comparing hidden states of one or more tokens associated with the one or more candidate draft predictions to the most recent hidden state.

In one or more implementations, generating the response including the draft prediction for the prompt to the large language model includes accepting, using a verification model, a plurality of draft tokens in the draft prediction based on new tokens generated by the large language model. In some embodiments, the series of acts 700 further includes an act of rejecting, using the verification model, one or more draft tokens in the draft prediction based on the new tokens generated by the large language model.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media. Non-transitory computer-readable storage media (devices) includes optical and/or non-optical memory, disks, or caches that store computer data interpretable by one or more processors to execute particular functions as described herein. A "network" is defined as one or more data links that enable the transport of electronic data between computer systems and/or modules and/or other electronic devices. Information is transferred or provided over a network (either hardwired, wireless, or a combination of hardwired or wireless) to a computer to carry program code in the form of computer-executable instructions or data structures and which can be accessed by a general purpose or special purpose computer.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Embodiments of the present disclosure can also be implemented in cloud computing environments. In this description, "cloud computing" is defined as a model for enabling on-demand network access to a shared pool of configurable computing resources. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth.

Figure 8:
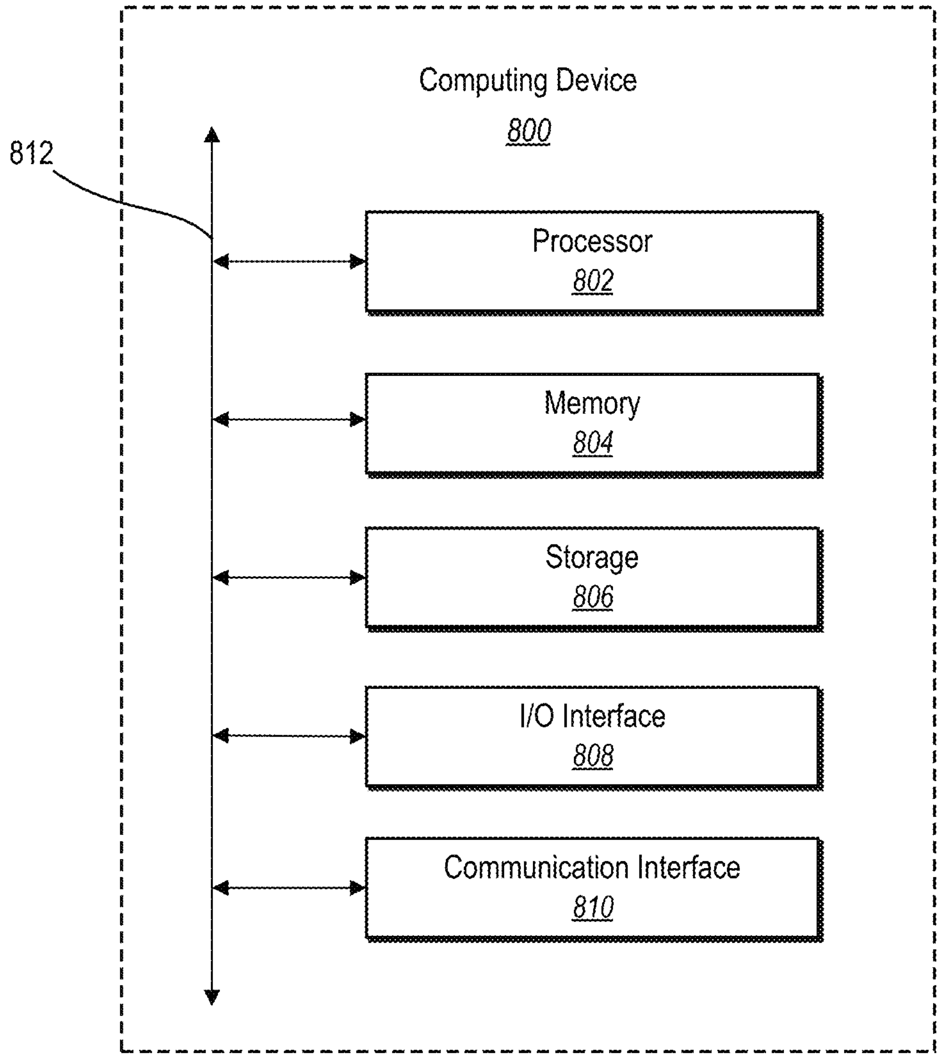
FIG. 8 illustrates a block diagram of an example computing device for implementing one or more embodiments of the present disclosure.

FIG. 8 illustrates, in block diagram form, an example computing device 800 (e.g., the computing device 800, the client device(s) 110, and/or the server device(s) 102) that may be configured to perform one or more of the processes described above. As shown by FIG. 8, the computing device can comprise a processor(s) 802, memory 804, a storage device 806, an I/O interface 808, and a communication interface 810.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them. The computing device 800 includes memory 804, which is coupled to the processor(s) 802. The memory 804 may be used for storing data, metadata, and programs for execution by the processor(s). The memory 804 may include one or more of volatile and non-volatile memories. The memory 804 may be internal or distributed memory. The computing device 800 includes a storage device 806 includes storage for storing data or instructions. As an example, and not by way of limitation, storage device 806 can comprise a non-transitory storage medium described above. The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808.

The computing device 800 can further include a communication interface 810. The communication interface 810 can include hardware, software, or both. The communication interface 810 can provide one or more interfaces for communication (such as, for example, packet-based communication) between the computing device and one or more other computing devices (e.g., computing device 800) or one or more networks. The computing device 800 can further include a bus 812. The bus 812 can comprise hardware, software, or both that couples components of computing device 800 to each other.

What is claimed is:

1. A computer-implemented method comprising:

determining, by at least one processor for a large language model, a prompt comprising a query and an input guide text related to the query;

determining, by the at least one processor at a time step of the large language model, one or more candidate draft predictions each comprising a plurality of tokens from one or more token sequences in the input guide text following one or more matching tokens that match a most recent token generated by the large language model;

generating, by the at least one processor at the time step of the large language model, a draft prediction by comparing tokens associated with the one or more candidate draft predictions to a hidden state of a previous token prior to the most recent token; and generating, by the at least one processor and for display via a client device, a response comprising the draft prediction for the prompt to the large language model.

2. The computer-implemented method of claim 1, further comprising generating, using the large language model, hidden states for the tokens associated with the one or more candidate draft predictions according to the input guide text.

3. The computer-implemented method of claim 2, wherein generating the draft prediction by comparing the tokens associated with the one or more candidate draft predictions to the hidden state of the previous token prior to the most recent token comprises comparing the hidden states for the tokens associated with the one or more candidate draft predictions to the hidden state of the previous token prior to the most recent token.

4. The computer-implemented method of claim 3, wherein comparing the tokens associated with the one or more candidate draft predictions to the hidden state of the previous token prior to the most recent token comprises:

determining, from the input guide text and for a candidate draft prediction of the one or more candidate draft predictions, a comparison token preceding a token matching the most recent token generated by the large language model;

determining, using the large language model, a hidden state of the comparison token; and comparing the hidden state of the comparison token to the hidden state of the previous token prior to the most recent token.

5. The computer-implemented method of claim 1, wherein generating the draft prediction by comparing the tokens associated with the one or more candidate draft predictions to the hidden state of the previous token prior to the most recent token comprises determining, using a cosine similarity comparison, a selected candidate draft prediction from among the one or more candidate draft predictions by determining that the selected candidate draft prediction has a highest cosine similarity to the hidden state of the previous token prior to the most recent token.

6. The computer-implemented method of claim 5, wherein generating the draft prediction further comprises determining, for inclusion in the draft prediction, a plurality of draft tokens in the selected candidate draft prediction following a matching token associated with the selected candidate draft prediction, wherein the matching token corresponds to the most recent token generated by the large language model.

7. The computer-implemented method of claim 1, wherein generating the response comprising the draft prediction comprises generating, using a verification model, the response by verifying a plurality of draft tokens in the draft prediction against new tokens generated by the large language model.

8. The computer-implemented method of claim 7, wherein generating the response comprising the draft prediction comprises generating the plurality of draft tokens accepted from the draft prediction at the time step of the large language model.

9. A system comprising:

one or more memory devices; and one or more processors configured to cause the system to:

determine, at a time step for a large language model and from a prompt comprising a query and an input guide text related to the query, one or more candidate draft predictions each comprising a plurality of tokens from one or more token sequences in the input guide text following one or more matching tokens that match based on-a most recent token generated by the large language model;

generate, at the time step of the large language model, a draft prediction by:

determining a most recent hidden state generated by the large language model in response to the query;

comparing tokens associated with the one or more candidate draft predictions to the most recent hidden state; and selecting, from the one or more candidate draft predictions, a candidate draft prediction with a highest similarity to the most recent hidden state; and generate, for display via a client device, a response comprising the draft prediction for the prompt to the large language model.

10. The system of claim 9, wherein comparing the tokens associated with the one or more candidate draft predictions to the most recent hidden state comprises:

generating, using the large language model, hidden states for one or more tokens associated with the one or more candidate draft predictions based on the input guide text; and comparing the hidden states for the one or more tokens associated with the one or more candidate draft predictions to the most recent hidden state to determine the candidate draft prediction with the highest similarity to the most recent hidden state.

11. The system of claim 9, wherein the one or more processors are further configured to generate the draft prediction by determining a plurality of draft tokens in the selected candidate draft prediction for inclusion in the draft prediction according to a predetermined number of draft tokens indicated by a hyperparameter of the large language model.

12. The system of claim 11, wherein determining the plurality of draft tokens in the selected candidate draft prediction for inclusion in the draft prediction comprises determining the plurality of draft tokens from one or more tokens that follow a matching token associated with the selected candidate draft prediction that corresponds to the most recent token generated by the large language model.

13. The system of claim 11, wherein the one or more processors are further configured to determine the predetermined number of draft tokens based on an average number of tokens accepted, via a verification model, from a plurality of draft predictions.

14. The system of claim 9, wherein the one or more processors are further configured to generate the response comprising the draft prediction for the prompt to the large language model by rejecting, using a verification model, one or more draft tokens in the draft prediction based on new tokens generated by the large language model utilizing a greedy decoding verification algorithm or a rejection sampling verification algorithm.

15. The system of claim 9, wherein the one or more processors are further configured to generate the draft prediction by:

determining a first candidate draft prediction by finding a first token sequence in the input guide text corresponding to the most recent token generated by the large language model;

determining a second candidate draft prediction by finding a second token sequence in the input guide text corresponding to the most recent token generated by the large language model;

comparing at least one token associated with the first candidate draft prediction and at least one token associated with the second candidate draft prediction to the most recent hidden state; and selecting the first candidate draft prediction in response to determining that the at least one token associated with the first candidate draft prediction has a highest similarity to the most recent hidden state.

16. A non-transitory computer readable medium storing executable instructions which, when executed by a processing device, cause the processing device to perform operations comprising:

determining, for a large language model, a prompt comprising a query and an input guide text related to the query;

determining, at a time step of the large language model, one or more candidate draft predictions each comprising a plurality of tokens from one or more token sequences in the input guide text following one or more matching tokens that match a most recent token generated by the large language model;

generating, at the time step of the large language model, a draft prediction by:

determining a most recent hidden state generated by the large language model in response to the query; and selecting, from the one or more candidate draft predictions, a candidate draft prediction by comparing tokens of the one or more candidate draft predictions to the most recent hidden state; and generating, for display via a client device, a response comprising the draft prediction for the prompt to the large language model.

17. The non-transitory computer readable medium of claim 16, wherein the operations further comprise generating, using the large language model, hidden states for one or more tokens associated with the one or more candidate draft predictions that precede tokens of the one or more candidate draft predictions that correspond to the most recent token generated by the large language model.

18. The non-transitory computer readable medium of claim 16, wherein determining the most recent hidden state generated by the large language model in response to the query comprises determining a hidden state of a previous token prior to the most recent token generated by the large language model.

19. The non-transitory computer readable medium of claim 16, wherein comparing tokens of the one or more candidate draft predictions to the most recent hidden state comprises comparing hidden states of one or more tokens associated with the one or more candidate draft predictions to the most recent hidden state.

20. The non-transitory computer readable medium of claim 16, wherein generating the response comprising the draft prediction for the prompt to the large language model comprises:

accepting, using a verification model, a plurality of draft tokens in the draft prediction based on new tokens generated by the large language model; and rejecting, using the verification model, one or more draft tokens in the draft prediction based on the new tokens generated by the large language model.

* * * * *